United States Patent
Schuster

(10) Patent No.: US 10,450,203 B2
(45) Date of Patent: *Oct. 22, 2019

(54) SMART WATER FILTER SYSTEM

(71) Applicant: Danco, Inc., Irving, TX (US)

(72) Inventor: Michael J. Schuster, Shorewood, IL (US)

(73) Assignee: Danco, Inc., Irving, TX (US)

(\*) Notice: Subject to any disclaimer, the term of this patent is extended or adjusted under 35 U.S.C. 154(b) by 87 days.

This patent is subject to a terminal disclaimer.

(21) Appl. No.: 15/227,559

(22) Filed: Aug. 3, 2016

(65) Prior Publication Data

US 2016/0340207 A1  Nov. 24, 2016

Related U.S. Application Data

(63) Continuation of application No. 14/640,758, filed on Mar. 6, 2015.
(Continued)

(51) Int. Cl.
*C02F 1/00* (2006.01)
*B01D 35/157* (2006.01)
(Continued)

(52) U.S. Cl.
CPC .............. *C02F 1/008* (2013.01); *B01D 29/50* (2013.01); *B01D 29/603* (2013.01); *B01D 35/1573* (2013.01); *C02F 1/003* (2013.01); *C02F 9/005* (2013.01); *E03C 1/04* (2013.01); *C02F 1/001* (2013.01); *C02F 1/68* (2013.01); *C02F 2201/005* (2013.01); *C02F 2201/006* (2013.01);
(Continued)

(58) Field of Classification Search
CPC .... C02F 1/008; C02F 1/003; C02F 2209/008; C02F 2209/40; E03C 1/04; B01D 35/1573; B01D 35/04; B01D 35/143; B01D 35/147
USPC ........................................................ 210/739
See application file for complete search history.

(56) References Cited

U.S. PATENT DOCUMENTS 4,029,121 A   6/1977 Buzzi
4,081,171 A   3/1978 Morgan et al.
(Continued)

OTHER PUBLICATIONS

International Search Report and Written Opinion for PCT/US15/19215 dated Jun. 3, 2015.
(Continued)

*Primary Examiner* — Robert Clemente
*Assistant Examiner* — Akash K Varma
(74) *Attorney, Agent, or Firm* — Thomas Horstemeyer, LLP.

(57) ABSTRACT

Various examples are provided for smart water filter systems. In one example, a smart water filter system includes a solenoid valve (or other electrically operated valve) in a water supply line of a faucet, and a filter bank coupled to the water supply line. Activation of the valve can stop the flow of unfiltered water through the faucet while allowing the flow of filtered water through the faucet. In another example, a smart water filter system includes a three-port solenoid (or electrically operated) valve coupled to a faucet, and a filter bank coupled to the water supply line and to a second inlet port of the three-port solenoid valve. Activation of the three-port valve can stop the flow of unfiltered water through the faucet while allowing the flow of filtered water through the faucet.

26 Claims, 32 Drawing Sheets

Related U.S. Application Data

(60) Provisional application No. 61/949,685, filed on Mar. 7, 2014, provisional application No. 61/983,057, filed on Apr. 23, 2014, provisional application No. 62/045,068, filed on Sep. 3, 2014.

(51) Int. Cl.
  B01D 29/60 (2006.01)
  B01D 29/50 (2006.01)
  C02F 9/00 (2006.01)
  E03C 1/04 (2006.01)
  C02F 1/68 (2006.01)

(52) U.S. Cl.
  CPC .. *C02F 2201/009* (2013.01); *C02F 2209/008* (2013.01); *C02F 2209/40* (2013.01); *C02F 2209/445* (2013.01); *C02F 2307/06* (2013.01); *C02F 2307/10* (2013.01); *E03C 2201/40* (2013.01); *Y02A 20/212* (2018.01)

(56) References Cited

U.S. PATENT DOCUMENTS

| | | | |
|---|---|---|---|
| 4,193,872 A | 3/1980 | Parkinson | |
| 4,360,037 A | 11/1982 | Kendall | |
| 4,488,055 A | 12/1984 | Toyama | |
| 4,508,136 A | 4/1985 | Kah, Jr. | |
| 4,837,870 A | 6/1989 | Wiley | |
| 4,885,081 A | 6/1989 | Oliver | |
| 4,948,090 A | 8/1990 | Chen | |
| 5,096,574 A | 3/1992 | Birdsong et al. | |
| 5,118,072 A | 6/1992 | Sakamoto et al. | |
| 5,126,041 A | 6/1992 | Weber et al. | |
| 5,173,178 A | 12/1992 | Kawashima et al. | |
| 5,213,303 A | 5/1993 | Walker | |
| 5,254,243 A | 10/1993 | Carr et al. | |
| 5,397,462 A | 3/1995 | Higashijima et al. | |
| 5,482,619 A | 1/1996 | Chow | |
| 5,658,457 A | 8/1997 | Schoenmeyr | |
| 5,699,833 A | 12/1997 | Tsataros | |
| 5,725,758 A | 3/1998 | Chace et al. | |
| 5,785,846 A | 7/1998 | Barnes et al. | |
| 5,911,240 A | 6/1999 | Kolar et al. | |
| 5,915,665 A | 6/1999 | Paese et al. | |
| 5,996,965 A | 12/1999 | Eichholz et al. | |
| 5,997,738 A | 12/1999 | Lin | |
| 6,076,550 A | 6/2000 | Hiraishi et al. | |
| 6,171,481 B1 | 1/2001 | Walfridsson | |
| 6,217,753 B1 | 4/2001 | Takigawa et al. | |
| 6,235,191 B1 | 5/2001 | Nakamura | |
| 6,508,272 B1 | 1/2003 | Parsons et al. | |
| 6,524,472 B2 | 2/2003 | Monroe | |
| 6,532,982 B2 | 3/2003 | Downer | |
| 6,968,860 B1 | 11/2005 | Haenlein et al. | |
| 7,014,166 B1 | 3/2006 | Wang | |
| 7,069,941 B2 | 7/2006 | Parsons et al. | |
| 7,070,695 B2 | 7/2006 | Husain et al. | |
| 7,143,898 B1 | 12/2006 | Hoaglin | |
| 7,285,210 B2 | 10/2007 | Schmitt | |
| 7,445,024 B2 | 11/2008 | Paterson et al. | |
| 7,681,860 B2 | 3/2010 | Maercovich | |
| 7,690,395 B2 | 4/2010 | Jonte et al. | |
| 7,703,740 B1 | 4/2010 | Franklin | |
| 7,810,650 B2 | 10/2010 | Ennis et al. | |
| 7,837,866 B2 | 11/2010 | Burrows | |
| 7,871,057 B2 | 1/2011 | Shimizu et al. | |
| 7,931,810 B2 | 4/2011 | Gaignet et al. | |
| 8,091,856 B2 | 1/2012 | Maercovich et al. | |
| 8,146,752 B2 | 4/2012 | Gaignet et al. | |
| 8,162,236 B2 | 4/2012 | Rodenbeck et al. | |
| 8,375,970 B2 | 2/2013 | Lautzenheiser et al. | |
| 8,443,825 B2 | 5/2013 | Lautzenheiser et al. | |
| 8,496,025 B2 | 7/2013 | Parsons et al. | |
| 8,528,579 B2 | 9/2013 | Jonte et al. | |
| 8,596,606 B2 | 12/2013 | Maercovich | |
| 9,285,807 B2 | 3/2016 | Rodenbeck et al. | |
| 2003/0029784 A1 | 2/2003 | Simon | |
| 2004/0206244 A1 | 10/2004 | Spiegel et al. | |
| 2005/0109703 A1 | 5/2005 | Newenhizen | |
| 2005/0253102 A1 | 11/2005 | Boilen | |
| 2005/0279676 A1 | 12/2005 | Izzy et al. | |
| 2006/0091063 A1 | 5/2006 | Paterson et al. | |
| 2006/0130907 A1 | 6/2006 | Marty et al. | |
| 2006/0130908 A1 | 6/2006 | Marty et al. | |
| 2006/0202142 A1 | 9/2006 | Marty et al. | |
| 2007/0057215 A1 | 3/2007 | Parsons et al. | |
| 2008/0189850 A1 | 8/2008 | Seggio et al. | |
| 2010/0116369 A1 | 5/2010 | Lautzenheiser et al. | |
| 2010/0139779 A1 | 6/2010 | Lautzenheiser et al. | |
| 2010/0193039 A1* | 8/2010 | Illingworth | E03C 1/04 137/112 |
| 2011/0079519 A1 | 4/2011 | Widler et al. | |
| 2011/0272611 A1 | 11/2011 | Huang | |
| 2011/0315262 A1 | 12/2011 | Butler et al. | |
| 2013/0056405 A1 | 3/2013 | Kawakami et al. | |
| 2013/0112903 A1* | 5/2013 | Conan | E03C 1/052 251/129.15 |

OTHER PUBLICATIONS

"Culligan® Aqua-Cleer® Advanced Drinking Water Systems Owners Guide," Culligan brochure, Dec. 2010.
"Watts® Premier Installation, Operation and Maintenance Manual," Watts brochure, Mar. 2009.

* cited by examiner

SMART WATER FILTER SYSTEM

CROSS REFERENCE TO RELATED APPLICATIONS

This application is a continuation of U.S. non-provisional application having Ser. No. 14/640,758, which was filed Mar. 6, 2015 and claims priority to, and the benefit of, U.S. provisional applications entitled "SMART WATER FILTER SYSTEM" having Ser. No. 61/949,685, which was filed Mar. 7, 2014; Ser. No. 61/983,057, which was filed Apr. 23, 2014; and Ser. No. 62/045,068, which was filed Sep. 3, 2014, all of which are hereby incorporated by reference in their entirety.

BACKGROUND

Water filters for widespread domestic water production have been in used since the 1800s. In the 1900s, sand filters were replaced by mechanical filtration to increase the filtration rate. In home filtration of water uses jug filters and filters attached to the end of a faucet to remove some chemicals and particulates in the water.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
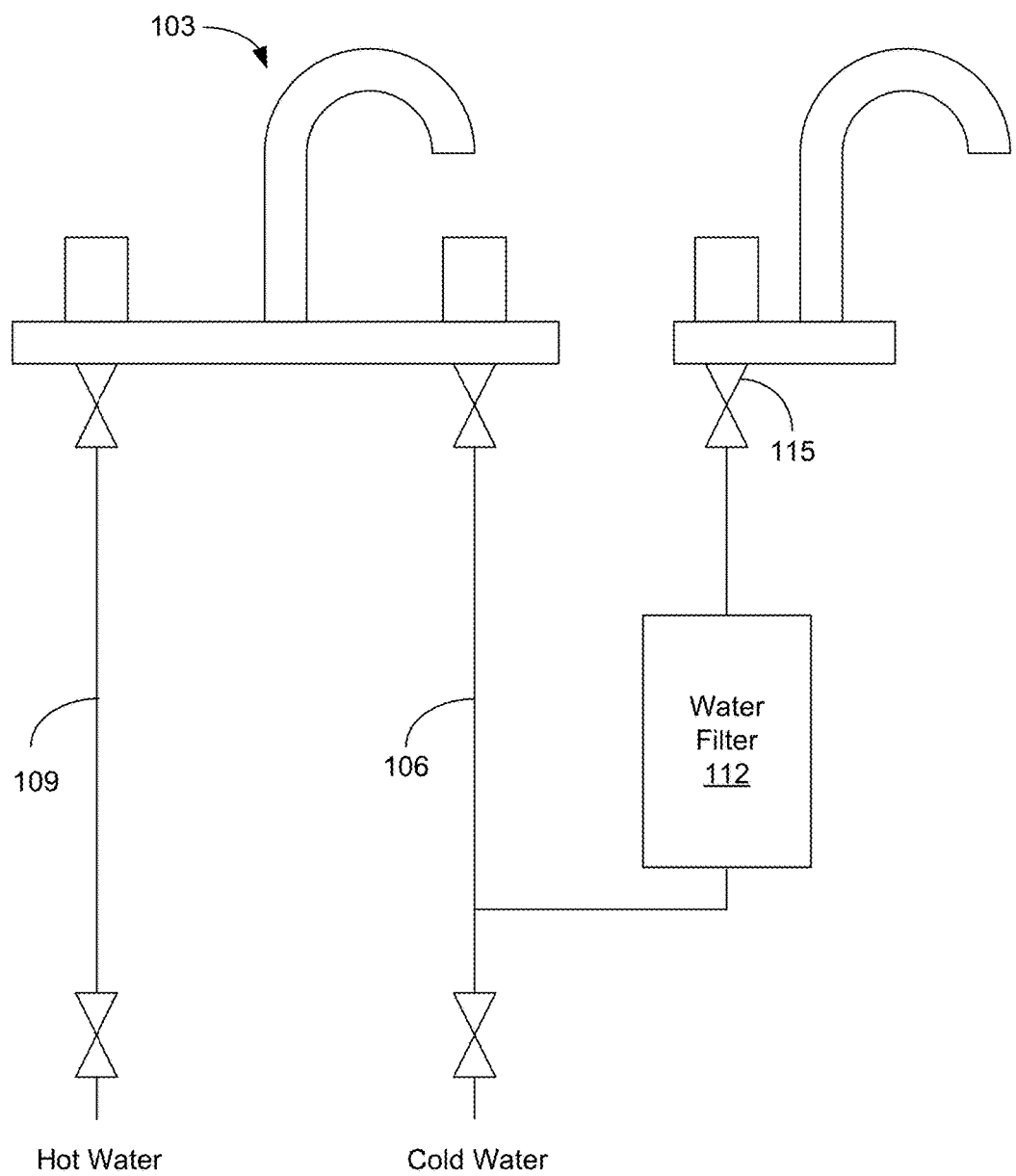
FIG. 1 is a schematic diagram of a water filter system for drinking water.

Disclosed herein are various examples related to a smart water filter system. Reference will now be made in detail to the description of the embodiments as illustrated in the drawings, wherein like reference numbers indicate like parts throughout the several views.

Water for most household applications is provided through a sink faucet. When filtered drinking water is desired, it is typically provided through a separate faucet located at the sink. Also, a separate faucet is typically used for removal of more harmful contaminants because of the resulting low water flow. While in-line filtration can improve taste and odor of the water, it may not be desirable to filter all the water being supplied through the faucet when only a portion of this water is used for drinking. By controlling when the water is being filtered, the cost associated with replacing expensive filters can be reduced. FIG. 1 shows a schematic diagram of a typical installation. Water is supplied to the faucet 103 through a cold water line 106 and a hot water line 109. Filtered drinking water is provided through the separate faucet via a filter 112 connected to the cold water line 106. A valve 115 on the separate faucet controls the water flow through the filter 112.

Figure 2A:
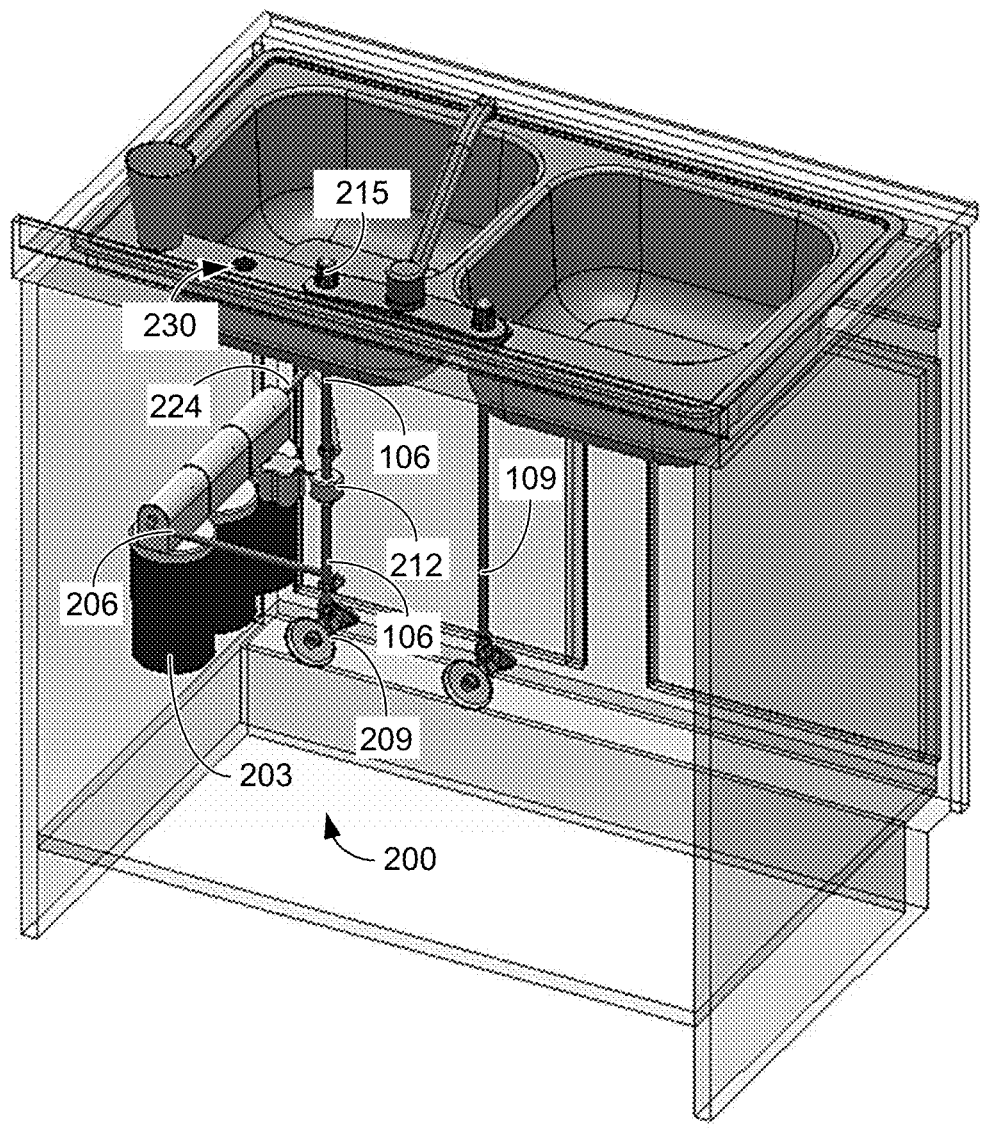
FIGS. 2A through 2C are perspective views of examples of a smart water filter system in accordance with various embodiments of the present disclosure.

Referring now to FIG. 2A, shown is one example of a smart water filter system 100 in accordance with various embodiments of the present disclosure. The smart water filter system 200 includes a filter bank 203 attached to a cold water line 106 of a sink. The filter bank 203 can include one or more filter cartridges for filtering chemicals, particulates and/or other materials out of the water. A combination of different types of filter cartridges can be used to address different elements in the water. For example, a portion of the filter bank can be configured to add nutrients and/or flavor back into the water if desired. A supply line 206 for the filter bank 203 is connected from the cold water line 106, between a cold water cutoff valve 209 and an electrically operated valve such as, e.g., a solenoid valve 212. A discharge line is connected from the filter bank 203 to the cold water line 106 between the solenoid valve 212 and a cold water valve 215 of the faucet. While the sink faucet of FIG. 2A includes separate cold water and hot water valves, other faucets can control hot and cold water flow through a single valve mechanism. While the kitchen faucet is portrayed in FIGS. 1-8, the smart filter water system 200 can also be applied to other applications (for example, bathroom sink faucets), where it is desirable to filter a portion of the water supplied through the faucet. User input to the smart water system 200 may be provided through one or more sensors 230.

Figure 2B:
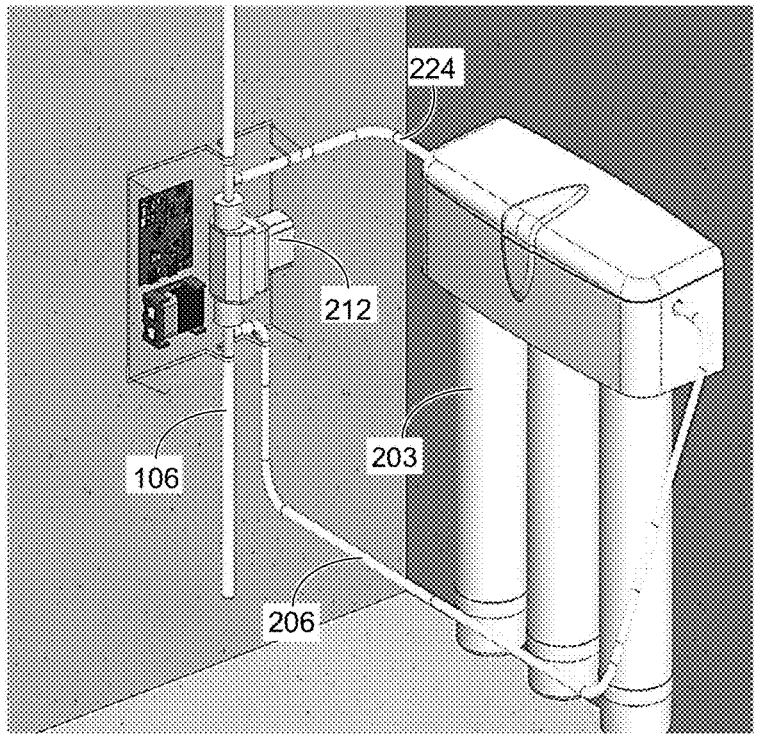
Figure 2C:
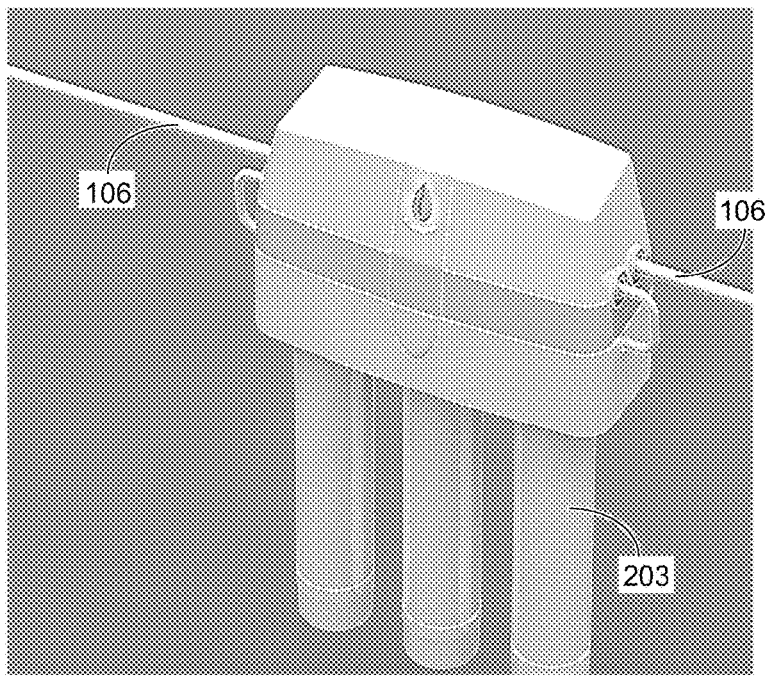

The hot water line 109 supplying the sink faucet is not connected to the smart water filter system 200 in FIG. 2A. In other implementations, the smart water filter system 100 may connected to the hot water line 109 instead of the cold water line 106, or in addition to the cold water line 106. For example, hot filtered water may be dispensed for drinks or to use for cooking. As can be understood, while the smart water filter system 200 is described providing water from the cold water line 106, the smart water filter system 200 can utilize water from a hot water line 109 in a similar fashion. FIGS. 2B and 2C show examples of various configurations of the smart water filter system 200. In the example of FIG. 2B, the solenoid valve 212 (including control circuitry and/or a battery) is located separately from the filter bank 203. In the example of FIG. 2C, the solenoid valve 212 (including, e.g., control circuitry and/or a battery for power) and filter bank 203 can be integrated into a single unit with the water supply line (e.g., cold water line 106) coupled to inlet and outlet connections of the single unit. The single unit can be configured with the solenoid and other circuitry located on the top of the filter bank 203 as shown in FIG. 2C, or in other locations about the filter bank 203 as can be understood. The supply and discharge lines of the filter bank 203 can be routed inside of the enclosure of the single unit, or outside the enclosure as shown in FIG. 2C.

Figure 3A:
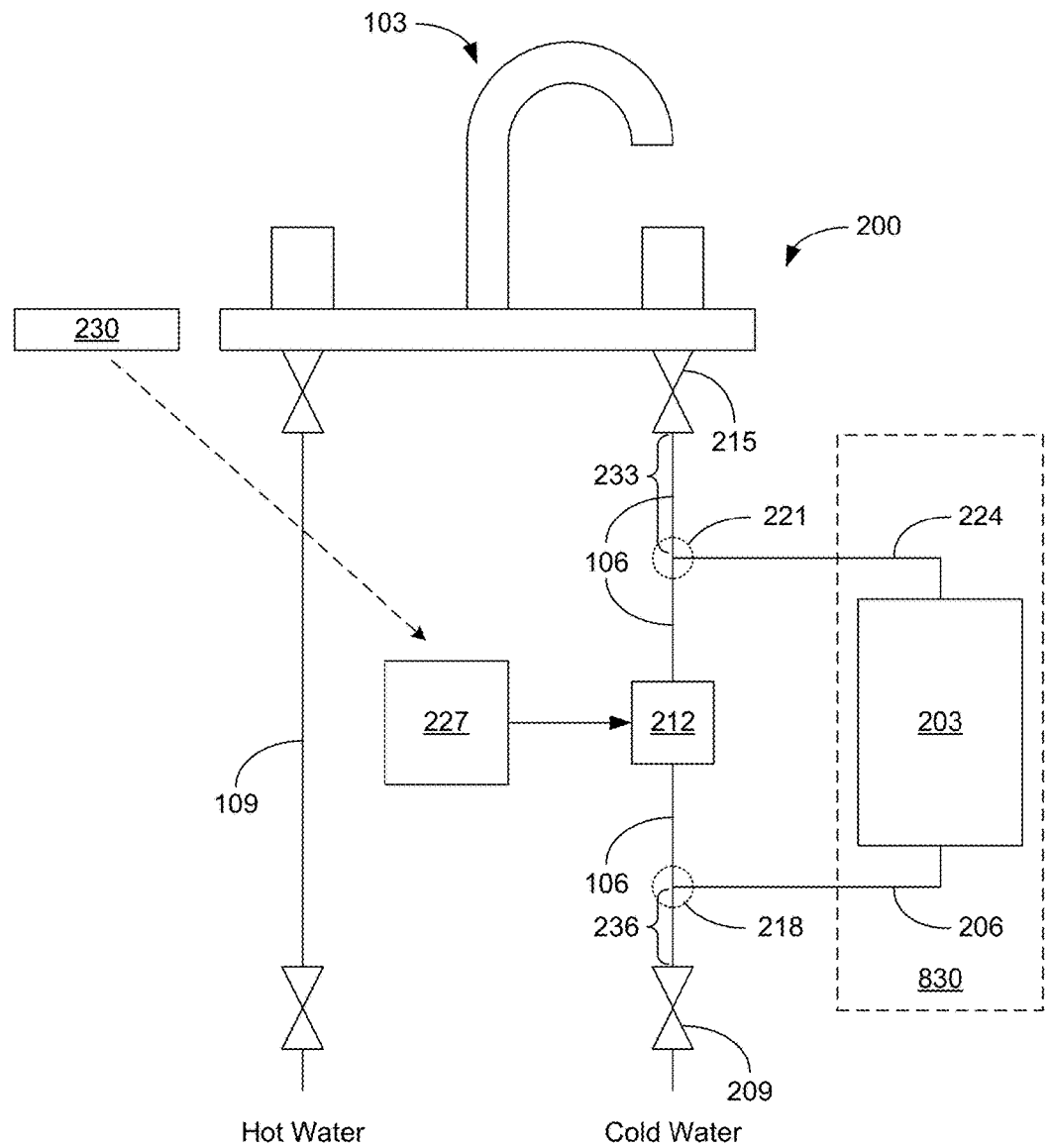
FIGS. 3A through 3D are schematic diagrams of various smart water filter systems in accordance with various embodiments of the present disclosure.

FIG. 3A shows a schematic diagram of the smart water filter system 200 of FIG. 2A comprising a conditioning system 830. The cold water line 106 includes a discharge line (or upper) tee 221 and/or a supply line (or lower) tee 218 for connecting the discharge line 224 and supply line 206, respectively. The discharge line tee 221 can be connected anywhere between the solenoid valve 212 and the cold water valve 215 of the faucet. While not illustrated in FIG. 3A, a water line filter (e.g., a self-cleaning screen filter or other replaceable or removable sediment filter) can be included before the solenoid valve 212 to reduce the amount of particulates reaching the filter bank 203, and to protect the solenoid 212 or other components from debris flowing through the cold water line 106. For example, the water line filter can be located in the cold water line 106 before the supply line tee 218 or can be included as part of the supply line tee 218. The discharge line tee 221 may be directly connected to the solenoid valve 212 and/or the cold water valve 215 and/or indirectly connected to the solenoid valve 212 and/or the cold water valve 215 via a section of, e.g., pipe, manifold or tubing. The supply line tee 218 can be connected anywhere between the cold water cutoff valve 209 and the solenoid valve 212. The supply line tee 218 may be directly connected to the cold water cutoff valve 209 and/or the solenoid valve 212 and/or indirectly connected to the cold water cutoff valve 209 and/or the solenoid valve 212 via a section of, e.g., pipe, manifold or tubing. In some implementations, the cold water line 106 can be connected directly to the single unit as shown in FIG. 2C, with the supply line tee 218 and discharge line tee 218 within the enclosure of the single unit.

Operation of the normally open solenoid valve 212 is controlled by a control unit 227, which can be included as part of the solenoid valve 212 or can be mounted separately in the space under the sink as illustrated in FIG. 2A. During normal operation of the sink faucet, the solenoid valve 212 remains de-energized and open, thereby allowing cold water to flow through the cold water line 106 bypassing the filter bank 203.

While cold water is not prevented from flowing through the filter bank 203, the back pressure produced by the filter bank 203 restricts the water flowing through the filter bank 203 to a small amount while the solenoid valve 212 remains open. This trickle flow prevents the water from remaining stagnant in the filter bank 203. In some embodiments, one or more venturis may be included at the discharge line tee 221 and/or the supply line tee 218 in the cold water line 106 to help draw a portion of the cold water through the filter bank 203. This allows the water in the filter cartridges to change over, keeping the water fresh and ready for use. It also helps to reduce the water temperature in the filter bank 203.

When the solenoid valve 212 is activated, the solenoid valve 212 closes and all of the cold water supplied to the sink faucet is routed through the filter bank 203, where it is filtered before being dispensed by the sink faucet. Activation of the solenoid valve 212 is controlled by the control unit 227. A sensor that senses water flow, temperature, pressure may awaken control unit 227. A generator (e.g., a micro hydro generator) can also sense flow and deliver power to awaken control unit 227 and/or sensor 230. The sensor 230 can be used to activate the solenoid valve 212 to dispense filtered water while water is flowing from the faucet. The sensor 230 may be a voice sensor, touch sensor, proximity sensor, bump sensor, magnetic sensor, RF identification (RFID) sensor, infrared (IR) sensor or other appropriate sensor. When the sensor 230 detects the appropriate trigger, the sensor 230 can communicate a signal to the control unit 227 to activate the solenoid valve 212. The sensor 230 may be part of the faucet or may be separate from the faucet as illustrated in FIG. 2A. The sensor 230 may be powered by a DC power source (e.g., batteries) or an AC source (e.g., 110V household power). In some embodiments, a generator (e.g., a micro hydro generator) can be installed in the cold water line 106 to provide some or all of the DC or AC power. Water flowing through the cold water line 106 can turn the generator to produce power for the control unit and/or sensor 230.

The sensor 230 communicates with the control unit 227 through a wired or wireless connection. The control unit 227 includes, e.g., a communication interface configured to receive and/or transmit signals from/to the sensor 230. The control unit 227 also includes circuitry configured to control the operation of the solenoid valve 212. In some implementations, the solenoid valve 212 may include the control unit 227. For example, the circuitry that controls operation of the solenoid valve may be incorporated into the solenoid valve 212. The control unit 227 may include a DC or AC power supply and control relay that can apply DC or AC power to the solenoid valve 212 in response to signaling from the sensor 230. In some implementations, the control unit 227 can supply 110 VAC power to the solenoid valve 212 to close the valve and initiate filtering of the water being dispensed from the faucet. In other embodiments, one or more batteries may supply the DC power for operation of the solenoid valve 212. In some embodiments, a generator can be installed in the cold water line 106 to provide some or all of the DC or AC power. Water flowing through the cold water line 106 can turn the generator to produce power for the sensor 230.

The solenoid valve 212 may be deactivated by the control unit 227 in response to timing out, turning off the faucet, and/or through a second input from the sensor 230. For instance, the control unit 227 may include a timer that causes the solenoid valve 212 to be de-energized after a predefined interval of time. In another embodiment, when the sensor 230 senses the appropriate trigger, it can provide a second signal that initiates deactivation of the solenoid valve 212. In other embodiments, a flow sensor (or flow switch) may be installed in the cold water line 106 (e.g., in and/or above the discharge line tee 221 or in and/or below the supply line tee 218) to detect water flow to the faucet. When flow stops, the solenoid valve 212 can be deactivated by the control unit 227.

In other implementations, one or more pressure sensors may be used to detect pressure in the cold water line 106 after and/or before the solenoid valve 212. When the cold water valve 215 is turned off, the pressure at the discharge line tee 221 will increase as it equalizes with the pressure at the supply line tee 218. Detection of the pressure increase or equalization can be used to control deactivation of the solenoid valve 212 by the control unit 227.

In some implementations, temperature sensors can be installed in the cold water line 106 (e.g., in and/or above the discharge line tee 221 or in and/or below the supply line tee 218) to detect temperature of the cold water line 106 after and/or before the solenoid valve 212. While the water is flowing, the temperature of the cold water line 106 will drop to the temperature of the cold water supply. When the water flow stops, the cold water line 106 will begin to warm up, eventually reaching room temperature. Monitoring the temperature and/or changes in temperature can provide an indication of when to deactivate the solenoid valve 212. In this way, the amount of water being filtered can be limited in a way that extends the filter life. Power for the flow, pressure and/or temperature sensors may be provided from a DC source such as batteries, an AC source such as 110V household power, a generator installed in the cold water line 106, or a combination thereof.

In some embodiments, the control unit 227 may shut down or enter a sleep mode to conserve power when no water is being supplied through the cold water line 106. Operation in a sleep mode can reduce power usage by the smart water filter system 200, thereby conserving energy and extending the life of a battery power supply. Water flow through the cold water line 106 can be monitored by the control unit 227 using one or more of the sensors described above (e.g., the flow sensor (or flow switch), the pressure sensor(s), temperature sensor(s) and/or one or more generator(s)). When it is determined that the water flow through the cold water line 106 has stopped, the control unit 227 may shut down or enter a sleep mode after a predefined period. When in the sleep mode, at least a portion of the circuitry in the control unit 227 can be powered down to save power. The sensor(s) may be monitored (either continuously or periodically) by the control unit 227 to determine when water begins to flow through the cold water line 106. When water flow is sensed, the control unit 227 starts up or exits the sleep mode in preparation for providing filtered water through the faucet.

In some implementations, a generator can be included in the cold water line 106 to produce AC and/or DC power when water is flowing through the cold water line 106. For example, the generator can be installed in and/or above the discharge line tee 221, in section 233 of the cold water supply line 106, or in and/or below the supply line tee 218, in section 236 of the cold water supply line 106. Water flowing through the cold water line 106 would turn the generator, which generates power for use by, e.g., the solenoid 212, the control unit 227 and/or the sensor 230 of the smart water filter system 200. As power is supplied by the generator with initiation of water flow through the cold water supply line 106, it can be used to power up the smart water filter system 200. When the water flow through the cold water supply line 106 stops, the generator no longer supplies power and the smart water filter system 200 can be shut down. A capacitor that is charged during operation of the generator can be used to provide power while shutting down the smart water filter system 200. In this way, the power needs of the smart water filter system 200 can be satisfied without the use of an additional power source. In addition, water flow through the cold water supply line 106 can be detected (e.g., by monitoring output voltage and/or frequency of the generator) without the use of a separate sensor.

In some cases, the power may be used to charge a battery included in the smart water filter system 200. By recharging the battery while water is flowing through the cold water supply line 106, the operational life of the battery can be extended. The control unit 227 can include voltage regulation and charging circuitry to control the power supplied to the battery of the smart water filter system 200, and to adjust battery charging to improve battery life. For instance, the generator may supply power to components of the smart water filter system 200 while water is flowing through the cold water supply line 106, and charge the battery at the same time. When the water flow stops, and the generator no longer produces power, the battery can supply the needed power to the smart water filter system 200. The battery can provide power during the transition from operation of the generator until the system is shut down or enters the sleep mode, as well as any power needed during the sleep mode.

In some cases, a time delay may be provided before initiating shut down or transition to a sleep mode. This can avoid unwanted shut down/start up transients when the faucet is accidently closed for a short period of time, such as when adjusting the water flow from the faucet. For example, a time delay of, e.g., about one to two seconds can ensure that the faucet was intentionally turned off before shutting down the system or entering the sleep mode. If a capacitor is used to provide ride through power, it can be sized to store sufficient energy to transition through the time delay and a subsequent shut down of the smart water filter system. If a battery is included, the battery can provide power for the transition from operation to shut down or to the sleep mode, as well as power for the sleep mode functions.

In various embodiments, additional water treatment cartridges (e.g., one or more fluoride, mineral, vitamin, and/or flavored cartridges) can be included at the inlet or outlet of the filter bank 203. For example, a fluoride cartridge may be configured to add fluoride to the filtered water. When the solenoid valve 212 is activated to begin supplying filtered water, fluoride may be injected (e.g., at a regulated pressure) or drawn into (e.g., through a venturi) the filtered water from the fluoride cartridge. A cartridge supply valve may be controlled by the control unit 227 in tandem with the solenoid valve 212. Other types of water treatment may also be possible.

Figure 3B:
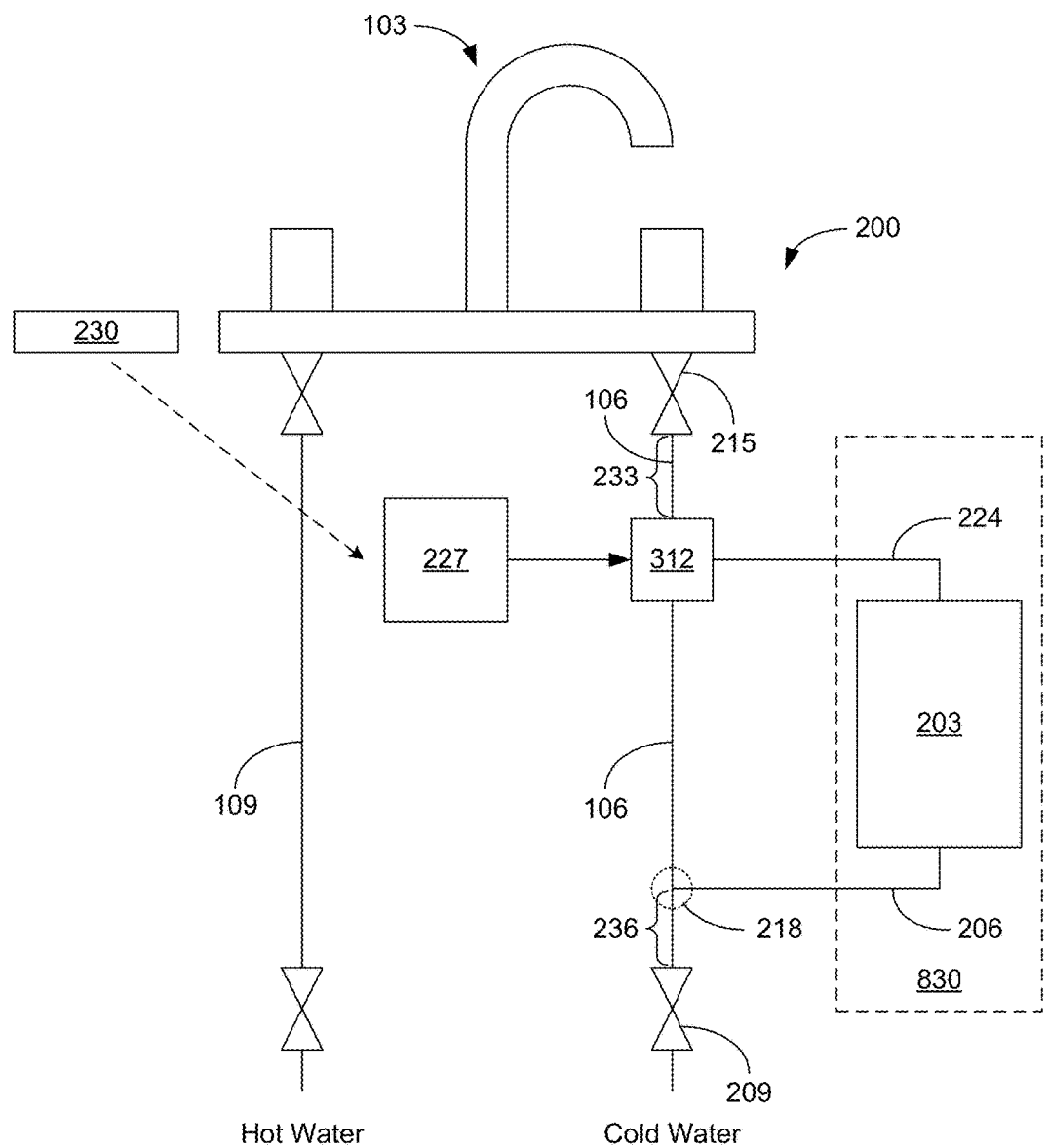

Referring next to FIG. 3B, shown is a schematic diagram of another example of the smart water filter system 200 comprising a conditioning system 830. As in the example of FIGS. 2A and 3A, the smart water filter system 200 includes a filter bank 203 attached to a cold water line 106 of a sink. A supply line 206 for the filter bank 203 is connected from the cold water line 106, between a cold water cutoff valve 209 and a three-port solenoid valve 312. The cold water line 106 includes a supply line tee 218 connecting the supply line 206. A discharge line 224 is connected from the filter bank 203 to a first port of the three-port solenoid valve 312. The cold water line 106 is connected to a second port of the three-port solenoid valve 312. The output port of the three-port solenoid valve 312 is connected to the cold water valve 215 of the faucet. Faucets that control hot and cold water flow through a single valve mechanism may also be used. In some implementations, a generator can be installed in and/or above the three-port solenoid valve 312, in section 233 of the cold water supply line 106, or in and/or below the supply line tee 218, in section 236 of the cold water supply line 106.

In the embodiment of FIG. 3B, the three-port solenoid valve 312 is used to switch the second port connected to the cold water line 106 and the first port connected to the discharge line 224 of the filter bank 203. When deactivated, the three-port solenoid valve 312 directs water from the cold water line 106 to the outlet port of the three-port solenoid valve 312 to supply unfiltered cold water to the faucet. When the control unit 227 activates the three-port solenoid valve 312, the three-port solenoid valve 312 directs water from the discharge line 224 of the filter bank 203 to the outlet port of the three-port solenoid valve 312 to supply filtered cold water to the faucet.

A sensor 230 can be used to activate the three-port solenoid valve 312 to dispense filtered water while water is flowing from the faucet in the same way as previously described with respect to solenoid valve 212 of FIG. 3A. The sensor 230 communicates with the control unit 227 through a wired or wireless connection to initiate activation of the three-port solenoid valve 312. The three-port solenoid valve 312 may be deactivated by the control unit 227 by timing out, turning off the faucet, and/or through a second input from the sensor 230 as previously described. In some implementations, the three-port solenoid valve 312 can include the circuitry of the control unit 227.

Figure 3C:
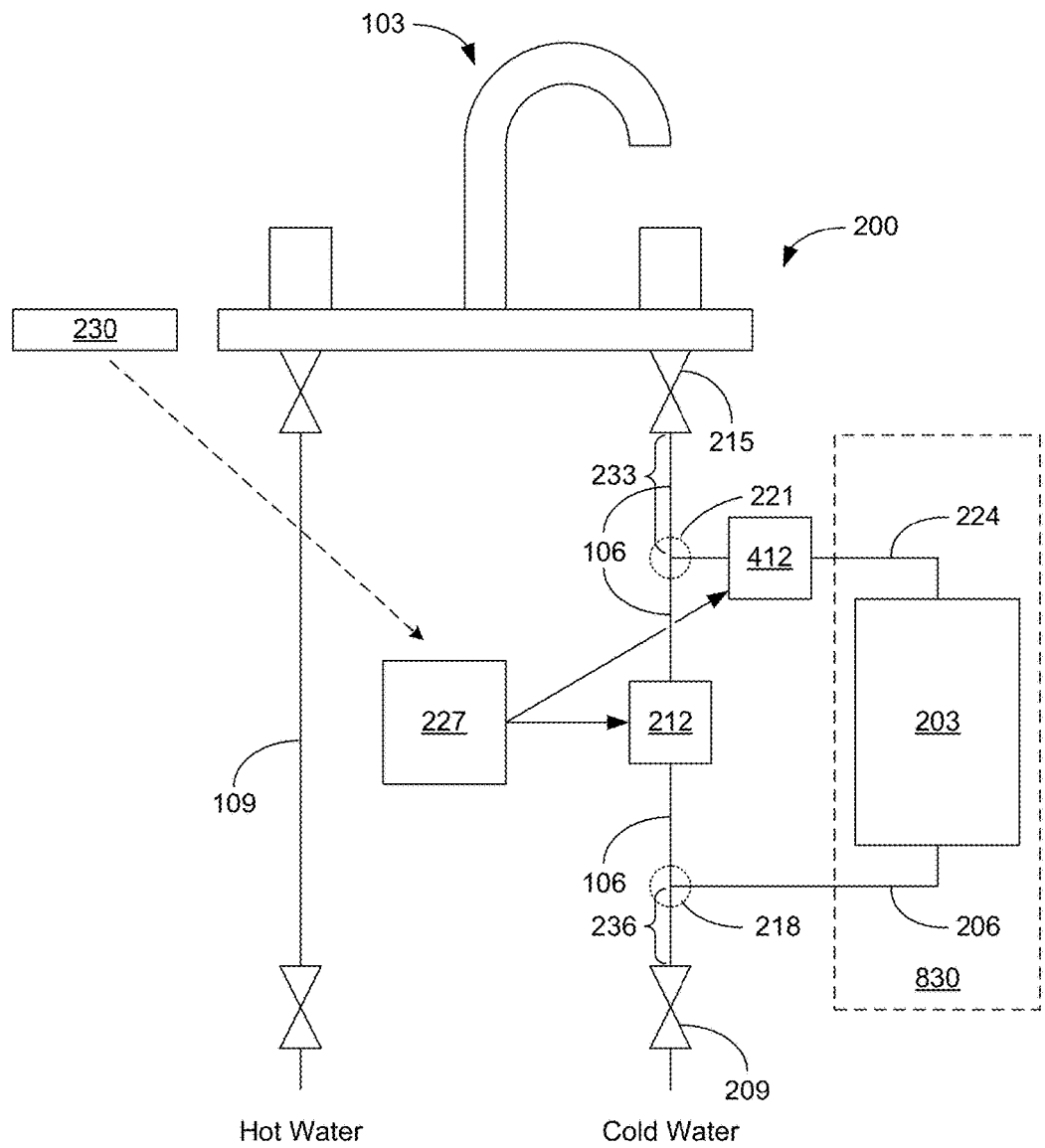

Referring next to FIG. 3C, shown is a schematic diagram of another example of the smart water filter system 200 comprising a conditioning system 830. As in the examples of FIGS. 2A and 3A, the smart water filter system 200 includes a filter bank 203 attached to a cold water line 106 of a sink. A supply line 206 for the filter bank 203 is connected from the cold water line 106, between a cold water cutoff valve 209 and a first solenoid valve 212. A discharge line 224 is connected from the filter bank 203 to the cold water line 106 between the solenoid valve 212 and a cold water valve 215 of the faucet. The cold water line 106 includes a discharge line tee 221 and/or a supply line tee 218 for connecting the discharge line 224 and supply line 206, respectively. The discharge line 224 includes a second solenoid valve 412 between the filter bank 203 and the discharge line tee 221.

In the embodiment of FIG. 3C, the first and second solenoid valves 212 and 412 are used to switch between supplying unfiltered water from the cold water line 106 and filtered water from the discharge line of the filter bank 203. The first solenoid valve 212 is a normally open valve and the second solenoid valve is a normally closed valve. The control unit 227 controls the operation of both the first and second solenoid valves 212 and 412. When the first and second solenoid valves 212 and 412 are deactivated, the first solenoid valve 212 directs unfiltered water from the cold water line 106 to the faucet while the second solenoid valve 412 stops water flow from the filter bank 203. When the control unit 227 activates the first and second solenoid valves 212 and 412, the second solenoid valve 412 allows filtered water from the discharge line 224 of the filter bank 203 to flow to the faucet while the first solenoid valve 212 stops the unfiltered water flow.

A sensor 230 can be used to activate the first and second solenoid valves 212 and 412 to dispense filtered water while water is flowing from the faucet in the same way as previously described with respect to solenoid valve 212 of FIG. 3A. The sensor 230 communicates with the control unit 227 through a wired or wireless connection to initiate activation of the first and second solenoid valves 212 and 412. The first and second solenoid valves 212 and 412 may be deactivated by the control unit 227 by timing out, turning off the faucet, and/or through a second input from the sensor 230 as previously described. In some implementations, the first and/or second solenoid valves 212/412 can include the circuitry of the control unit 227.

Figure 3D:
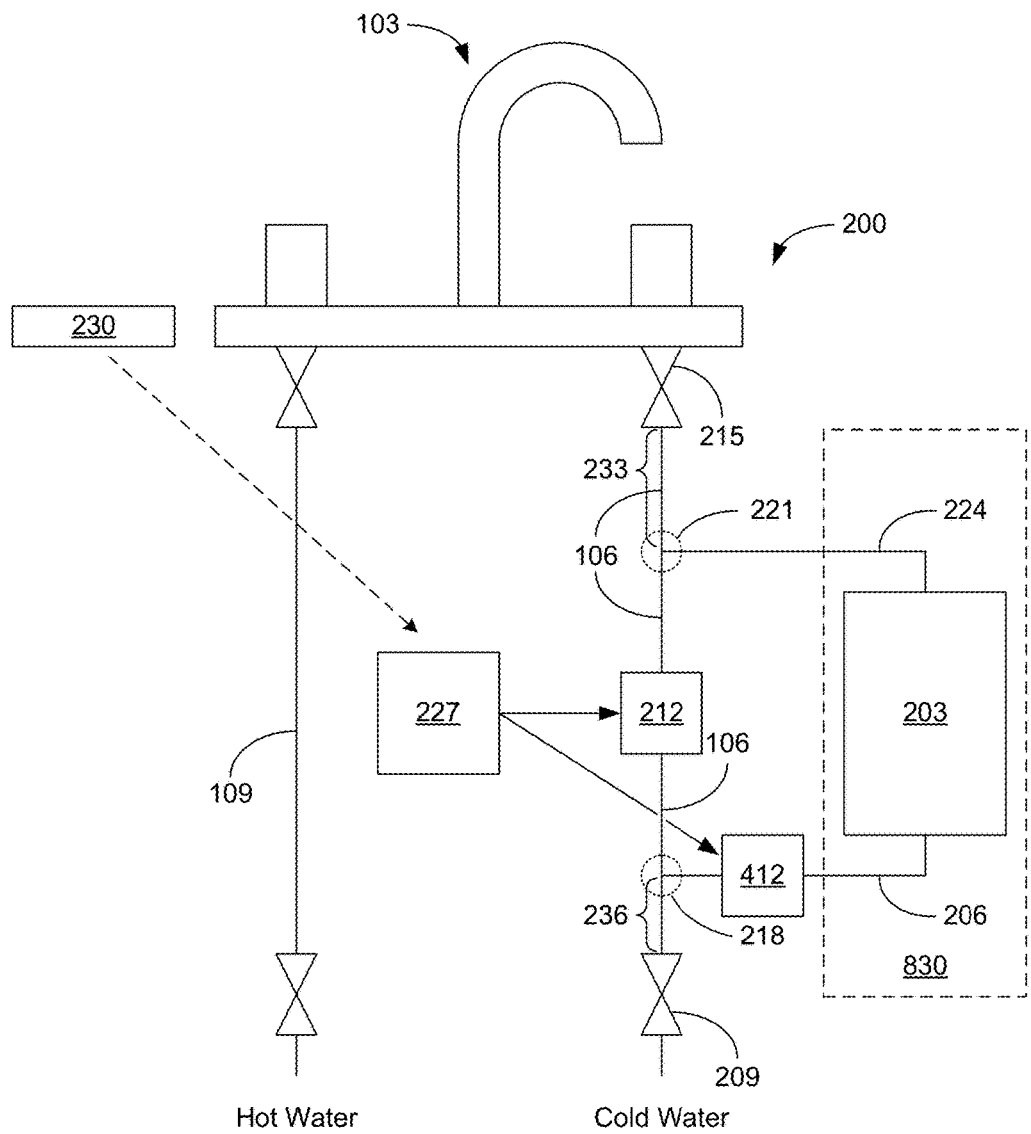

Referring now to FIG. 3D, shown is a schematic diagram of an alternate example of the smart water filter system 200 of FIG. 3C comprising a conditioning system 830. In the example of FIG. 3D, the supply line 206 includes the second solenoid valve 412 between the supply line tee 218 and the filter bank 203. When the first and second solenoid valves 212 and 412 are deactivated, the first solenoid valve 212 directs unfiltered water from the cold water line 106 to the faucet while the second solenoid valve 412 stops water flow to the filter bank 203. When the control unit 227 activates the first and second solenoid valves 212 and 412, the second solenoid valve 412 supplies water to the filter bank 203 and thus allows filtered water to flow through the discharge line 224 to the faucet while the first solenoid valve 212 stops the unfiltered water flow.

A sensor 230 can be used to activate the first and second solenoid valves 212 and 412 to dispense filtered water while water is flowing from the faucet in the same way as previously described with respect to solenoid valve 212 of FIG. 3A. The sensor 230 communicates with the control unit 227 through a wired or wireless connection to initiate activation of the first and second solenoid valves 212 and 412. The first and second solenoid valves 212 and 412 may be deactivated by the control unit 227 by timing out, turning off the faucet, and/or through a second input from the sensor 230 as previously described. In some implementations, the first and/or second solenoid valves 212/412 can include the circuitry of the control unit 227.

Operation of the smart water filter system 200 will now be discussed with respect to the example of FIG. 3A. In one implementation, among others, the sensor 230 of the smart water filter system 200 can be a RFID sensor that detects RFIDs that are attached to a container such as, e.g., a water glass, pitcher or other water vessel. Initially, a user of the smart water filter system 200 turns on the faucet to supply cold water. With the normally open solenoid valve 212 deactivated, unfiltered water flows through the cold water line 106 and out of the faucet. In the example of FIG. 3A, only a small amount of water flows through the filter bank and mixes with the unfiltered water. In the examples of FIGS. 3B-3D, water flow through the filter bank 203 is stopped by the three-port solenoid valve 312 or the second solenoid valve 412.

If the smart water filter system 200 includes a generator in the cold water supply line 106, turning on the faucet initiates water flow through the generator and production of power for the smart water filter system 200. If the smart water filter system 200 was shut down, production of power by the generator can initiate the startup of the smart water filter system 200. If in a sleep mode, the smart water filter system 200 can be woken up for operation. If other sensors are used to monitor water flow, the system can be started up or woken up in response to an appropriate indication from the sensor. The smart water filter system 200 can then begin monitoring for an indication from the sensor 230.

When the user desires filtered water to be dispensed through the faucet 103, the user places a water glass with an RFID next to the sensor 230, which causes the control unit 227 to activate the solenoid valve 212 in FIG. 3A (or three-port solenoid valve 312 in FIG. 3B or first and second solenoid valves 212 and 412 in FIGS. 3C and 3D). The flow of unfiltered water to the faucet 103 through the cold water line 106 is stopped and redirected to the filter bank 203, where it is filtered and provided to the faucet through the discharge line. Because of the added restriction of the filter bank 203, the water flow from the faucet is reduced when the solenoid valve 212 is activated.

Filtered water continues to flow from the faucet until the solenoid valve 212 is deactivated using one of the methods described above. For example, the solenoid valve 212 may be deactivated by turning off the cold water valve 215. When the end of the water flow is detected by the control unit 227 using one of the methods (e.g., using flow sensor(s), flow switch(es), pressure sensor(s), temperature sensor(s) and/or generator(s)), the control unit 227 deactivates the solenoid valve 212 allowing unfiltered water to be supplied through the faucet again. Alternatively, the water glass with the RFID may be placed next to the sensor 230, which communicates a second signal to the control unit 227 causing the solenoid valve to be deactivated. In this case, the cold water may continue to flow during deactivation of the solenoid valve 212.

Dispensing the filtered water may be controlled using other types of sensors as well. For example, a magnetic sensor may be used in place of an RFID sensor. A container may include a magnetic component to activate and/or deactivate the flow of filtered water through the faucet 103. In some implementations, a touch sensor, proximity sensor, bump sensor or IR sensor can be used to control the smart water filter system 200. For example, proximity sensor or IR sensor can detect when a user's hand is placed in position to activate or deactivate the flow of filtered water. A touch sensor or bump sensor can be used to physically control the system operation. In some cases, the sensor may be integrated into the faucet for ease of use. Voice control may also be possible through a voice sensor. In some embodiments, it may be desirable for the sensor 230 to include a touch sensor that reads a person's hydration level and provide feedback to the person via the sensor 230 or via wireless communication with a smart device such as, but not limited to, a laptop, tablet, smart phone and/or personal monitoring device that can be worn. The information may be displayed or accessible through an application (or app) executing on the smart device.

While the present disclosure discusses the electrically operated valves in the context of solenoid valves, other electrically controlled valves such as motorized valves or other electrically operated valves may also be utilized. In addition, the solenoid valves have been described as normally-open or normally-closed when deactivated. This allows the system to still provide water flow through the cold water line 106 even if power to the solenoid valves fails. However, in alternative implementations, solenoid valve 212 may be normally-closed solenoid valve. In that case, the control unit 227 maintains the solenoid valve 212 in an activated condition to allow for unfiltered water flow and deactivates the solenoid valve 212 to supply filtered water. Similarly, solenoid valves 412 may be normally-open solenoid valves that remain energized by the control unit 227 until filtered water is desired by the user.

Figure 4A:
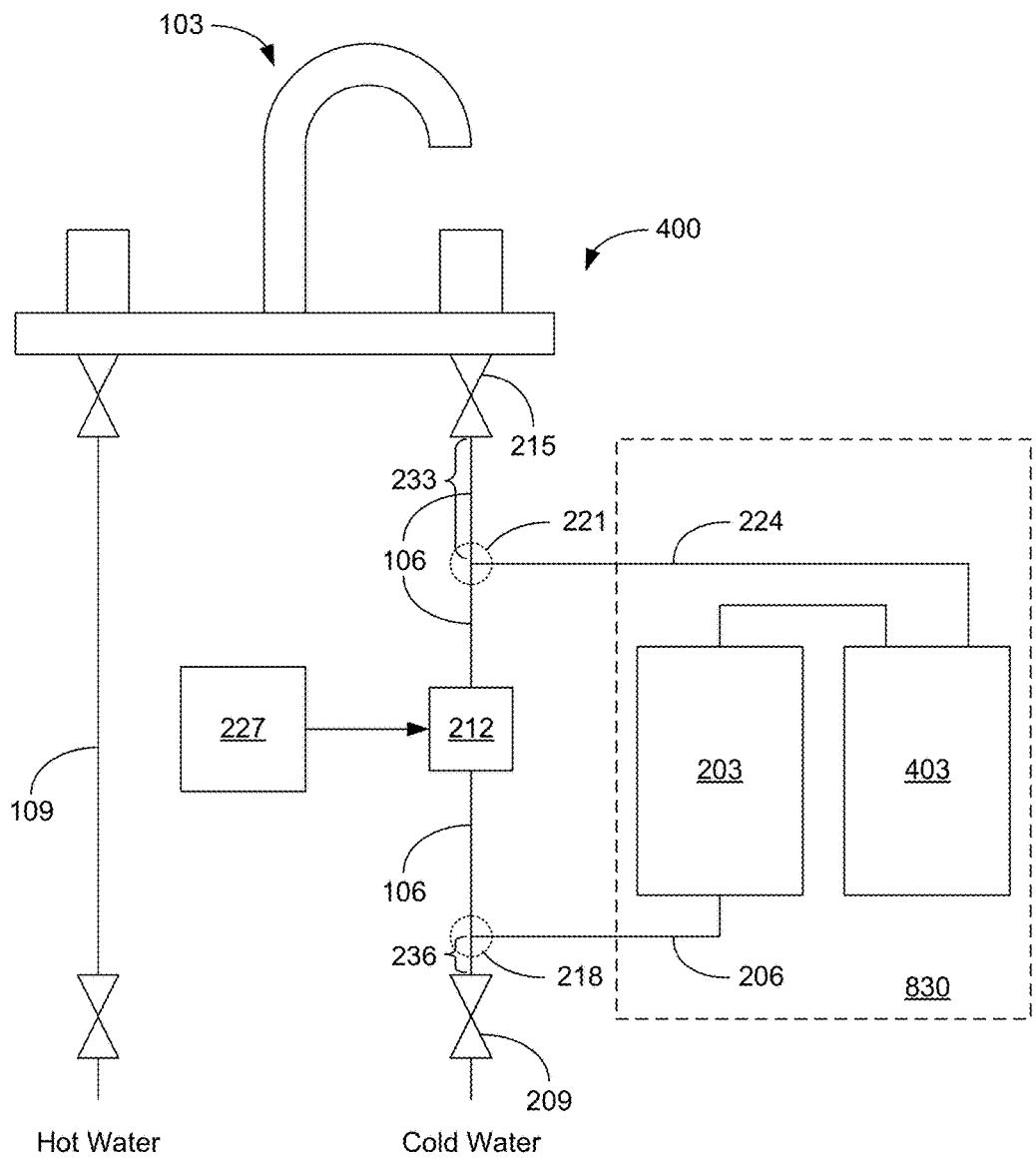
FIGS. 4A through 4D are schematic diagrams of various smart water filter systems including a chiller unit in accordance with various embodiments of the present disclosure.

The smart water filter system 200 of FIGS. 2A-2C and 3A-3D may also include other features such as a water chiller and/or water carbonation. Referring to FIG. 4A, shown is a smart water filter system 400 comprising the smart water filter system 200 of FIG. 3A comprising a conditioning system 830 with a chiller unit 403 installed between the filter bank 203 and discharge line 224 connected to the cold water line 106 at the discharge line tee 221. The chiller unit 403 can be mounted in the space under the sink as illustrated in FIG. 2A. In the smart water filter system 400 of FIG. 4A, operation of the normally-open solenoid valve 212 controls filtered water flow through the chiller unit 403. As discussed with respect to FIG. 3A, operation of the normally open solenoid valve 212 is controlled by control unit 227. During normal operation of the sink faucet, the solenoid valve 212 remains de-energized and open allowing cold water to flow through the cold water line 106 bypassing the filter bank 203 and the chiller unit 403. The chiller unit 403 can include a reservoir that holds a defined volume of filtered water, which can be maintained at or below a preset temperature or within a preset temperature band. For example, the chiller unit 403 may cycle on and off to maintain the water temperature within a defined temperature range such as, e.g., about 35° F. to about 40° F. The temperature range of the chilled water may be adjusted through control settings of the chiller unit 403.

In some embodiments, cold water is prevented from flowing through filter bank 203 when the smart water filter system 200 is not activated. While in other embodiments, cold water is not prevented from flowing through the filter bank 203 and the chiller unit 403, the back pressure produced by the filter bank 203 and chiller unit 403 restricts the water flowing through the filter bank 203 and chiller unit 403 to a small amount while the solenoid valve 212 remains open. This trickle flow can prevent the water from remaining stagnant in the filter bank 203 and chiller unit 403. It can also help maintain the temperature of the water in the discharge line 224 below the ambient temperature, which may reduce the time it takes to dispense chilled water from the faucet 103. In some embodiments, a venturi may be included to help draw a portion of the cold water through the filter bank 203 and the chiller unit 403.

As discussed with respect to FIG. 3A, the solenoid valve 212 closes when activated and all of the cold water supplied to the sink faucet is routed through the filter bank 203 and the chiller unit 304 as shown in FIG. 4A. The water is filtered by the filter bank 203 and the filtered water is cooled by the chiller unit 403 before being dispensed by the sink faucet 103. Activation of the solenoid valve 212 is controlled by the control unit 227. A sensor 230 (FIG. 3A) can be used to activate the solenoid valve 212 to dispense chilled filtered water while water is flowing from the faucet. When the sensor 230 detects the appropriate trigger, the sensor 230 can communicate a signal to the control unit 227 to activate the solenoid valve 212. The control unit 227 can also ensure that the chiller unit 403 is operating when the appropriate trigger is received. For example, the control unit 227 can start the chiller unit 403 when the solenoid valve 212 is activated to avoid any delay in cooling the filtered water. An indication can be provided to the user to indicate when cool filtered water is being dispensed. For instance, a temperature sensitive strip (or other indicator) may be included on the faucet to provide a visual indication of the temperature of the water being dispensed. The solenoid valve 212 may be deactivated by the control unit 227 in response to timing out, turning off the faucet, and/or through a second input from the sensor 230 as previously discussed.

The chiller unit 403 may also control the water temperature in the reservoir based upon the time of day. For example, the water temperature may be maintained at a higher temperature during time periods (e.g., 12 am to 6 am or 1 am to 5 am) when little water is being used. This can save energy by reducing the power consumption of the chiller unit 403. If the smart water filter system 400 is activated during that time period, the chiller unit 403 can automatically reduce the water temperature to within the preset temperature band. In some cases, the control unit 227 and/or the chiller unit 403 can monitor and learn the water usage patterns of the household, which can be used to control sleep modes and/or reduced power usage states.

Figure 4B:
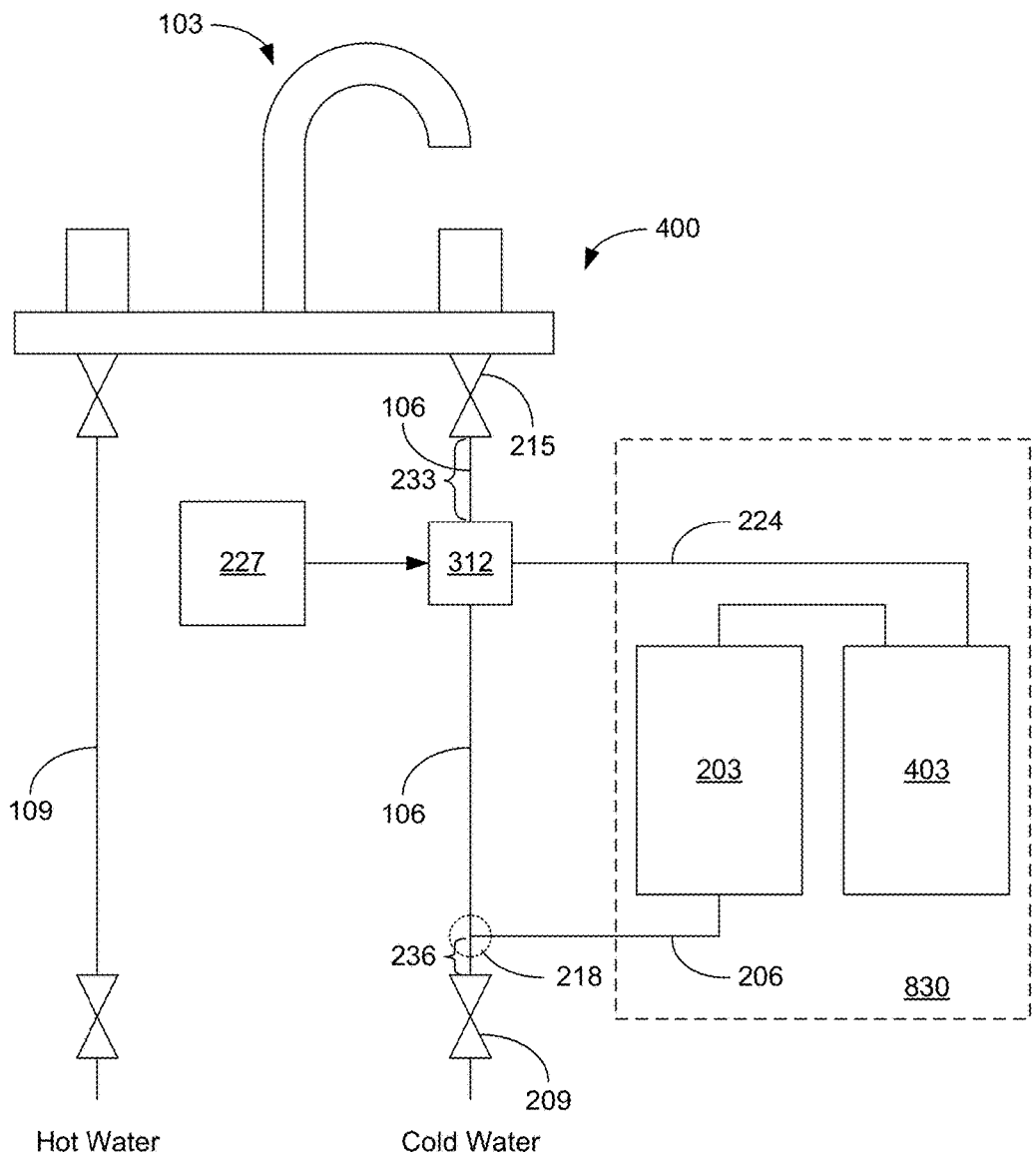
Figure 4C:
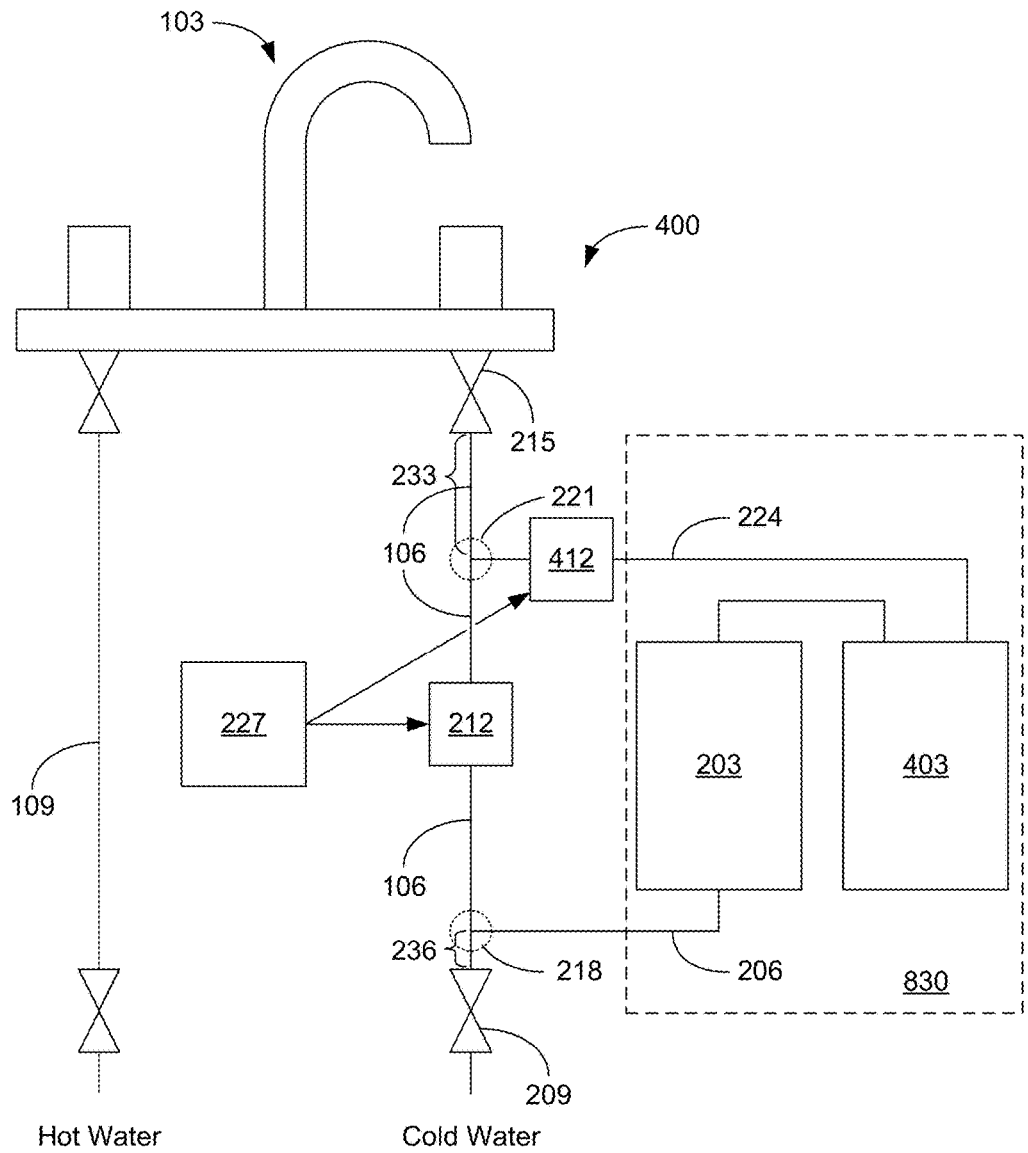
Figure 4D:
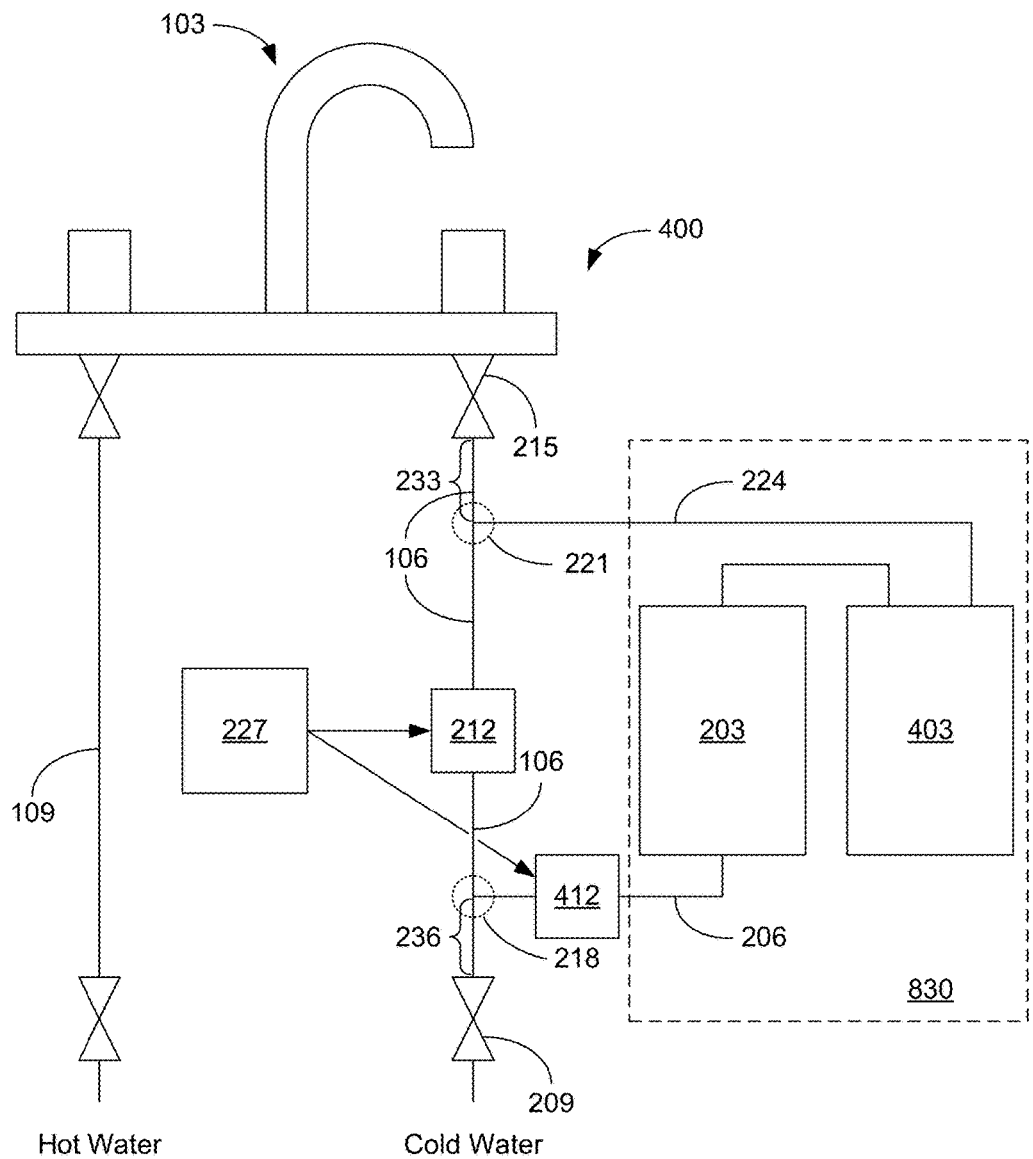

Referring to FIGS. 4B through 4D, shown are smart water filter systems 400 comprising the smart water filter systems 200 of FIGS. 3B through 3D, respectively, comprising a conditioning system 830 including a chiller unit 403 installed between the filter bank 203 and discharge line 224. Operation of the three-port solenoid valve 312 of FIG. 4B and the first and second solenoid valves 212 and 412 of FIGS. 4C and 4D controls water flow through the filter bank 203 and chiller unit 403 as discussed with respect to FIGS. 3B through 3D, respectively. Operation of the chiller unit 403 is consistent with that described with respect to FIG. 4A.

Figure 5A:
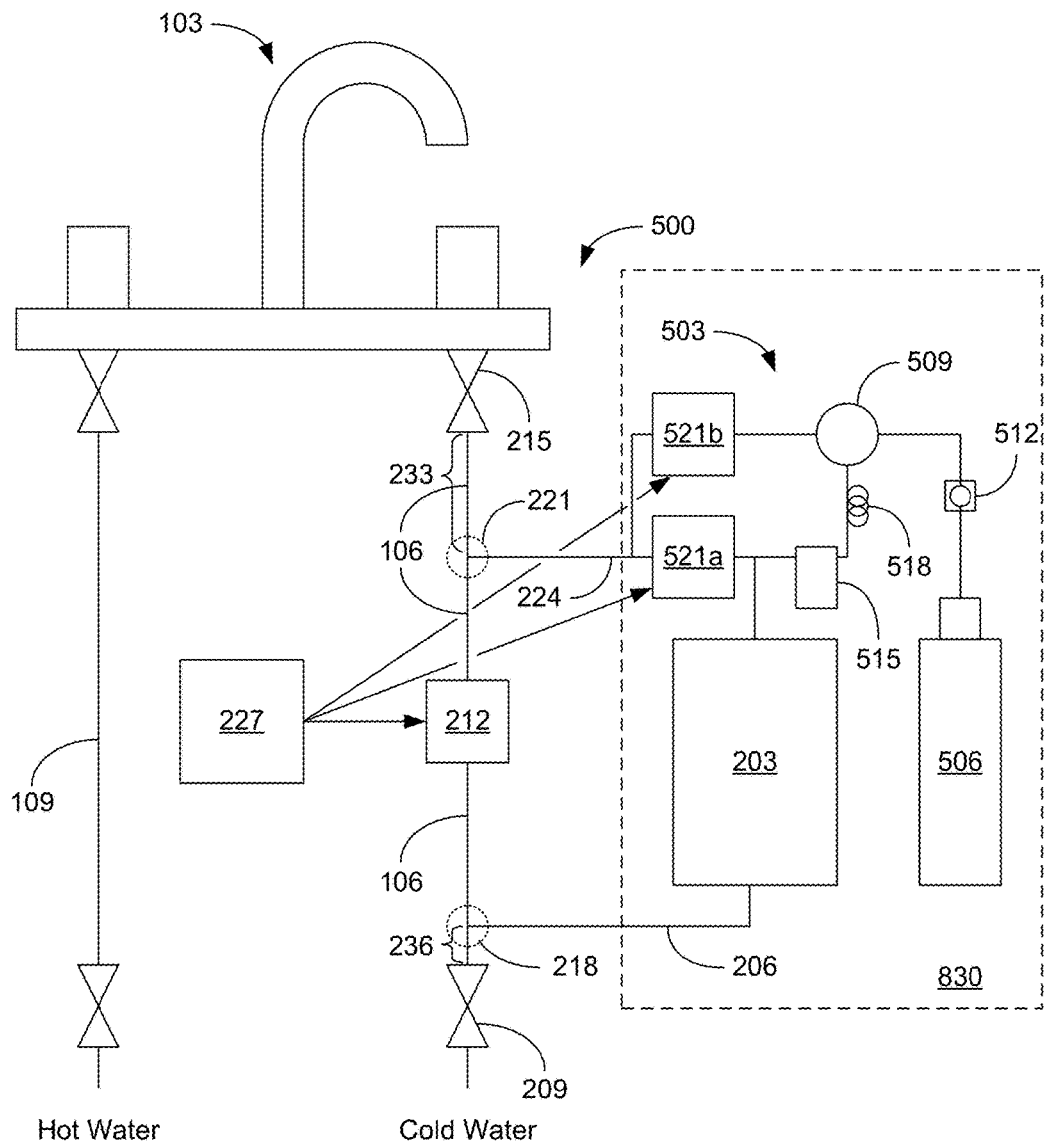
FIGS. 5A through 5D are schematic diagrams of various smart water filter systems including a carbonation system in accordance with various embodiments of the present disclosure.

Referring next to FIG. 5A, shown is a smart water filter system 500 comprising the smart water filter system 200 of FIG. 3A comprising a conditioning system 830 with a carbonation system 503 installed in the discharge line 224 between the filter bank 203 and the discharge line tee 221.

The carbonation system 503 includes a carbon dioxide ($CO_2$) canister 506 that stores pressurized $CO_2$ that is supplied to a carbonator tank 509 for carbonation of the filtered water. A pressure regulator 512 at the outlet of the $CO_2$ canister 506 controls the pressure of the $CO_2$ supplied to the carbonator tank 509. In some embodiments, the pressure regulator 512 can include a pressure gauge. For example, the $CO_2$ may be supplied to the carbonator tank 509 at a pressure of about 45-100 pounds per square inch (psi).

A carbonator pump 515 boosts the pressure of the filtered water that is supplied to the carbonator tank 509. A pulsation damper (not shown) can be included at the inlet of the carbonator pump 515 to prevent pulsations from being transmitted back to the cold water line 106. Coiling coils 518 can also be included between the carbonator pump 515 and the carbonator tank 509 to remove at least a portion of the heat added to the filtered water by the carbonator pump 515. A check valve in the water inlet of the carbonator tank 509 can prevent backflow to the carbonator pump 515. Normally-open and normally-closed solenoid valves 521a and 521b, respectively, are used to control flow of carbonated water through the sink faucet 103 as will be discussed.

In some implementations, a normally-closed solenoid valve (not shown) may be included between the pressure regulator 512 and the carbonator tank 509 to prevent the carbonator tank 509 from remaining pressurized when the carbonation system 593 is not being used. Activation of this solenoid valve can be controlled in the same fashion as solenoid valves 521a and 521b, where activation opens the solenoid valve to allow $CO_2$ to be added to the filtered water in the carbonator tank 509. The carbonation system 503 can be mounted in the space under the sink as illustrated in FIG. 2A.

In the smart water filter system 500 of FIG. 5A, operation of the normally open solenoid valve 212 controls water flow through the filter bank 203 as previously discussed with respect to FIG. 3A. During normal operation of the sink faucet 103, the solenoid valve 212 remains de-energized and open allowing cold water to flow through the cold water line 106 bypassing the filter bank 203 and the carbonation system 503. When the solenoid valve 212 is activated, the solenoid valve 212 closes and all of the cold water supplied to the sink faucet is routed through the filter bank 203, where it is filtered before being dispensed by the sink faucet 103. Activation of the solenoid valve 212 is controlled by the control unit 227. A sensor 230 (FIG. 3A) can be used to activate the solenoid valve 212 to dispense filtered water while water is flowing from the faucet.

If carbonation of the filtered water is not desired or activated, then solenoid valves 521a and 521b remain deactivated and uncarbonated filtered water is routed to the faucet 103 via normally-open solenoid valve 521a. When carbonated water is desired by a user, control unit 227 can active solenoid valves 521a and 521b to divert the filtered water flow through the carbonation system 503 by closing solenoid valve 521a and opening solenoid valve 521b. The control unit 227 also initiates operation of the carbonator pump 515 to begin injecting the pressurized water into the carbonator tank 509. Filtered water flows from the filter bank 203 through the carbonator pump 515 to the carbonator tank 509, where it is combined with the $CO_2$ from the $CO_2$ canister 506. The carbonated water then flows from the carbonator tank 509 to the faucet 103 through solenoid valve 521b. Solenoid valve 521a remains closed to prevent backflow of the carbonated water.

The sensor 230 can be used to activate the solenoid valves 521a and 521b to dispense carbonated water while water is flowing from the faucet 103. When the sensor 230 detects the appropriate trigger, the sensor 230 can communicate a signal to the control unit 227 to activate the solenoid valve 212. When the sensor 230 detects a second trigger, the sensor 230 can communicate a signal to the control unit 227 to activate the solenoid valves 521a and 521b to provide carbonated water. For instance, the sensor 230 of the smart water filter system 500 can be a RFID sensor that detects RFIDs that are attached to a container such as, e.g., a water glass, pitcher or other water vessel. By placing the container within range of the RFID sensor once, the control unit can activate solenoid valve 212 to provide uncarbonated filtered water. Carbonated water can be supplied by placing the container within range of the RFID sensor a second time within a predefined time period. With the appropriate trigger, solenoid valves 521a and 521b and carbonation pump 515 can be activated by control unit 227 to divert filtered water through the carbonation system 503. Solenoid valves 212, 521a and 521b and carbonation pump 515 may be deactivated by the control unit 227 in response to timing out, turning off the faucet, and/or through a second input from the sensor 230.

Figure 5B:
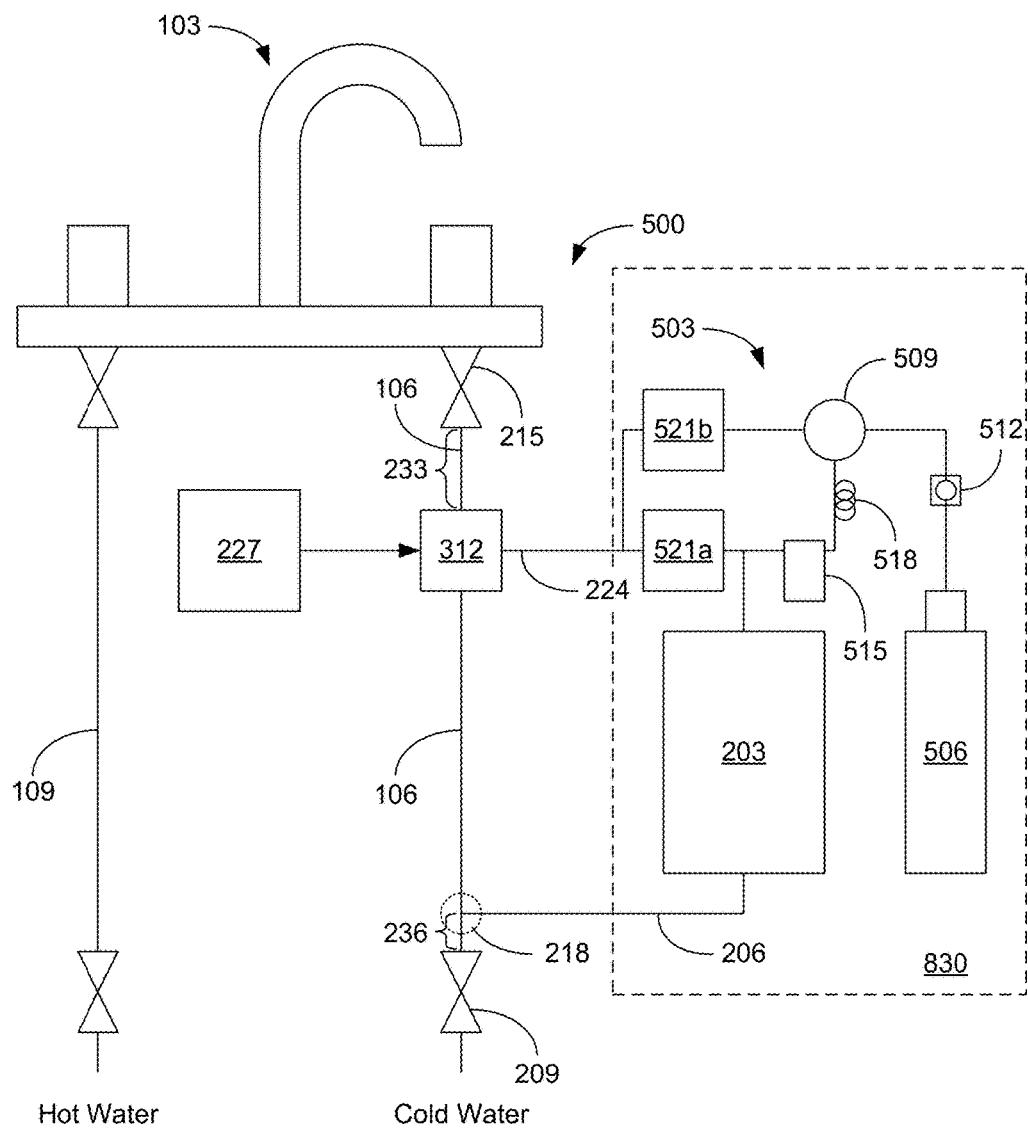
Figure 5C:
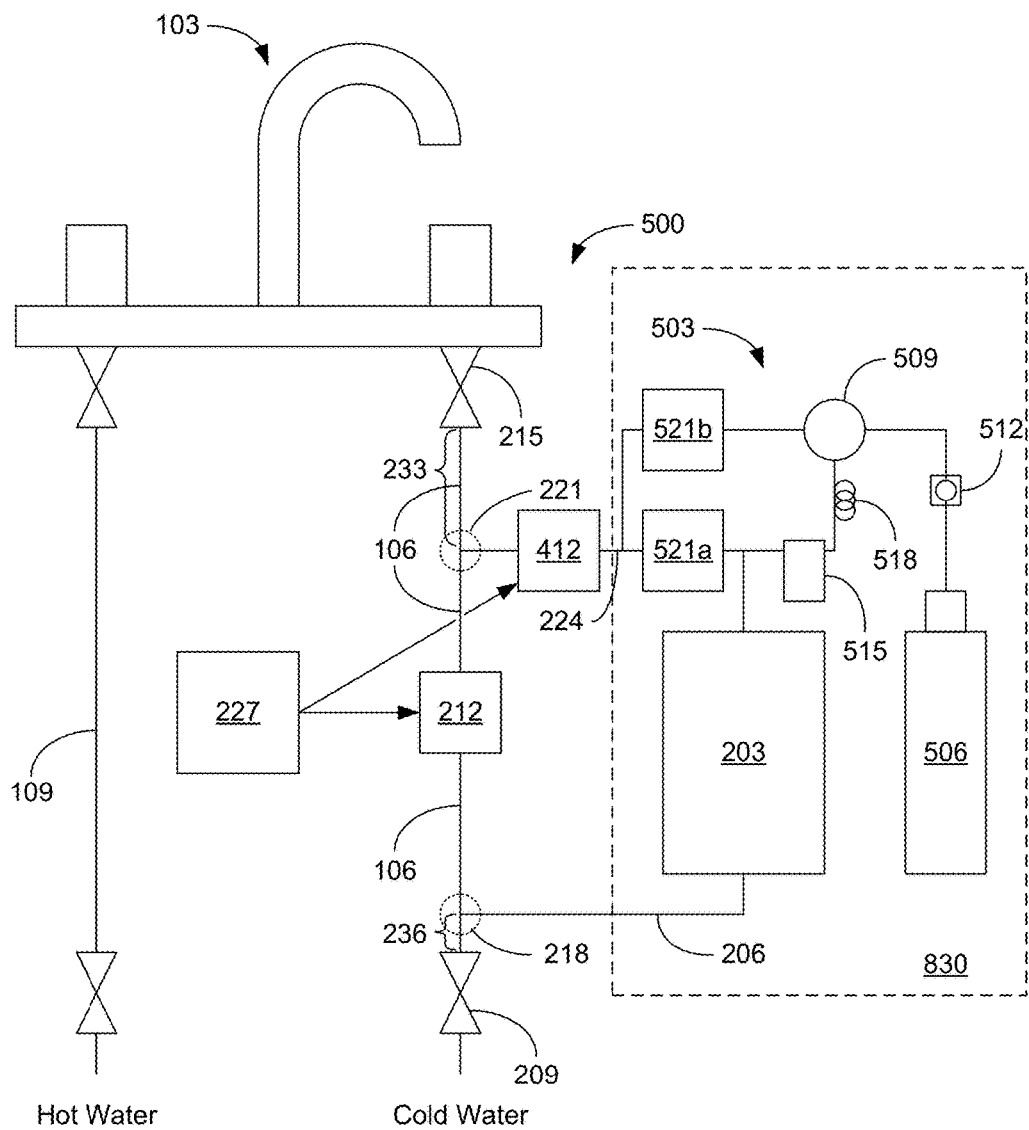
Figure 5D:
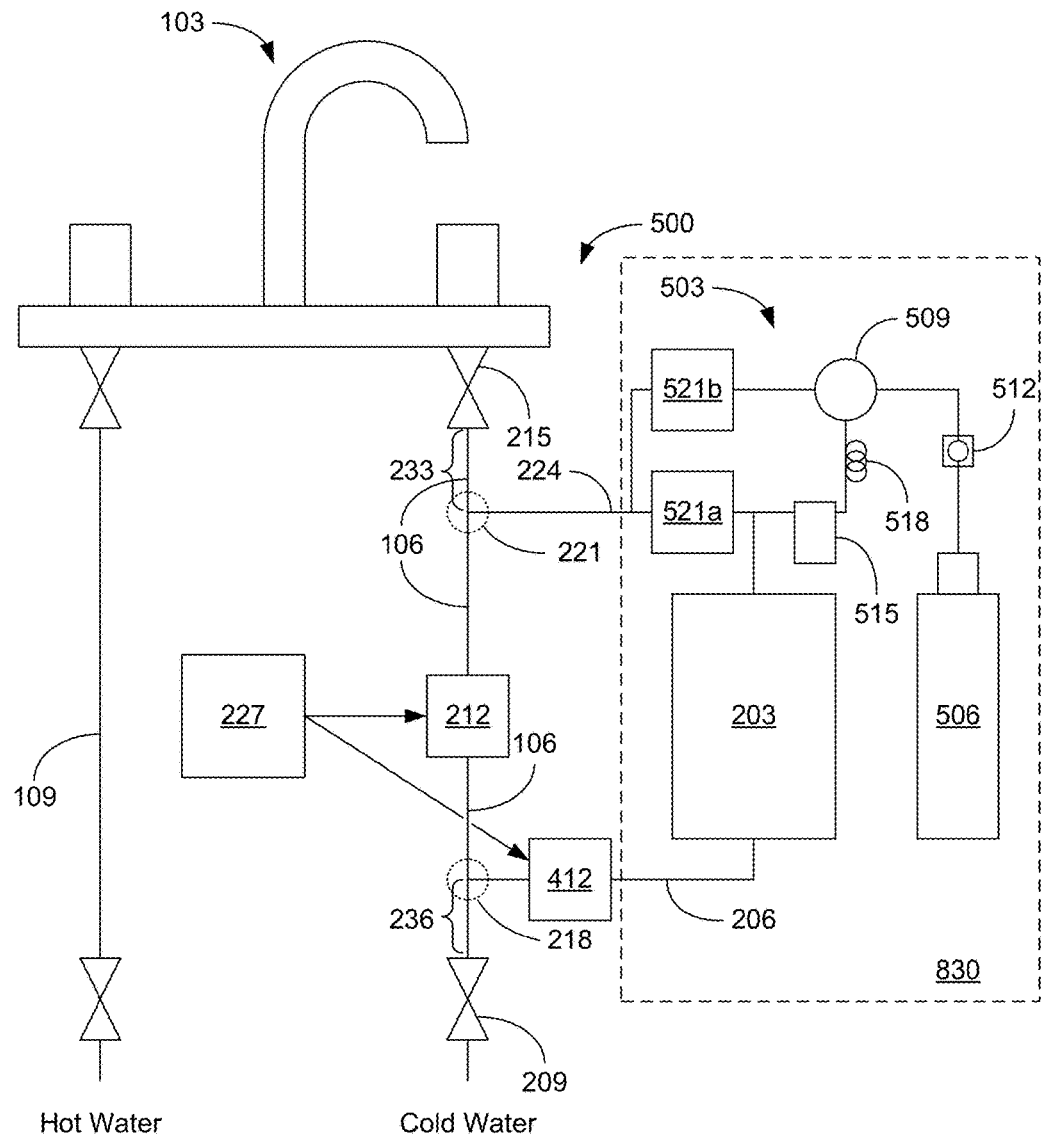

Referring to FIGS. 5B through 5D, shown are smart water filter systems 500 comprising the smart water filter systems 200 of FIGS. 3B through 3D, respectively, comprising a conditioning system 830 including a carbonation system 503 installed in the discharge line 224. Operation of the three-port solenoid valve 312 of FIG. 5B and the first and second solenoid valves 212 and 412 of FIGS. 5C and 5D controls water flow through the filter bank 203 as discussed with respect to FIGS. 3B through 3D, respectively. Solenoid valves 521a and 521b and the carbonation pump 515 can be activated by the control unit 227 to control the flow of water through the carbonation system 503 as described with respect to FIG. 5A.

Figure 6A:
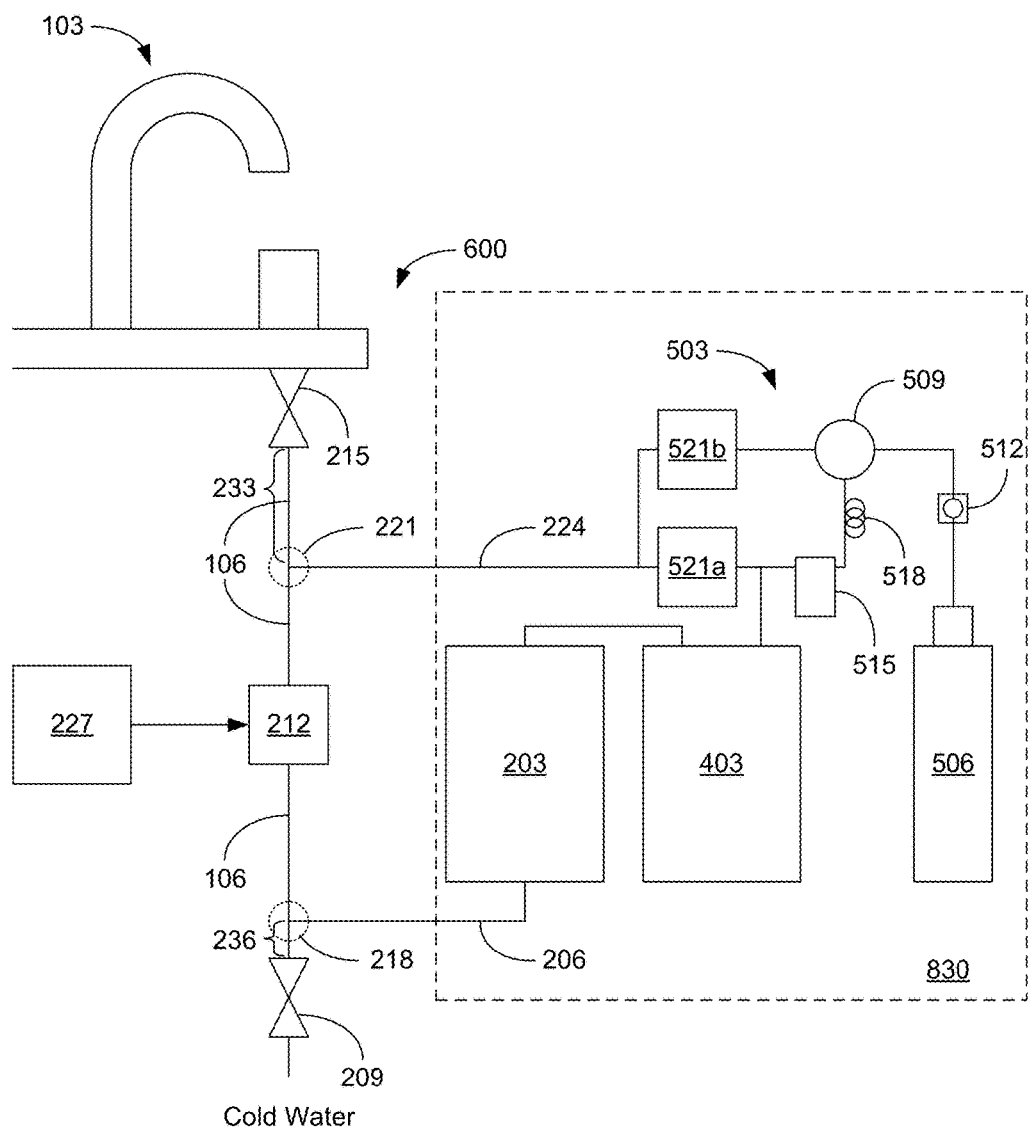
FIGS. 6A through 6D are schematic diagrams of various smart water filter systems including a chiller unit and a carbonation system in accordance with various embodiments of the present disclosure.
Figure 6B:
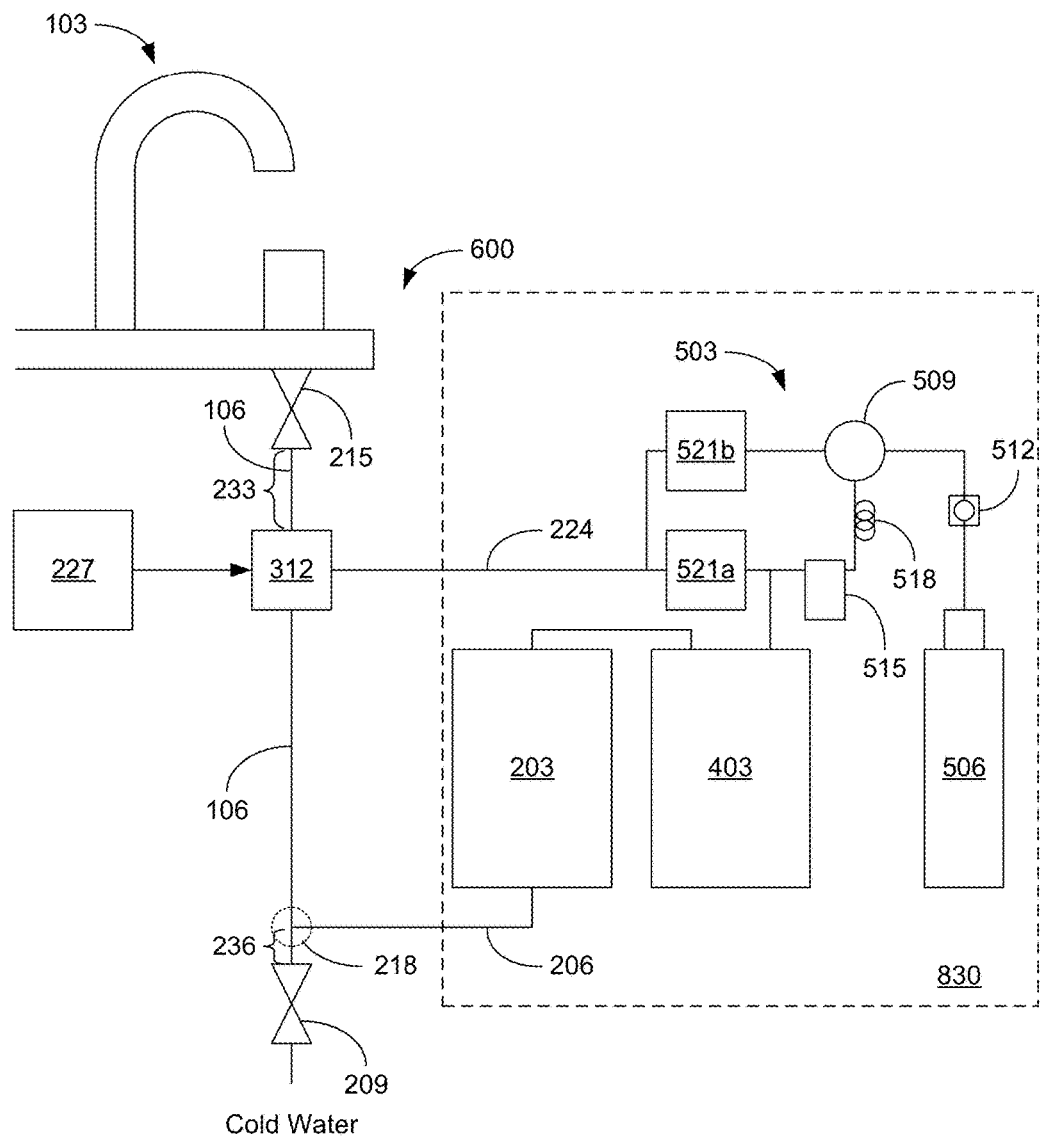
Figure 6C:
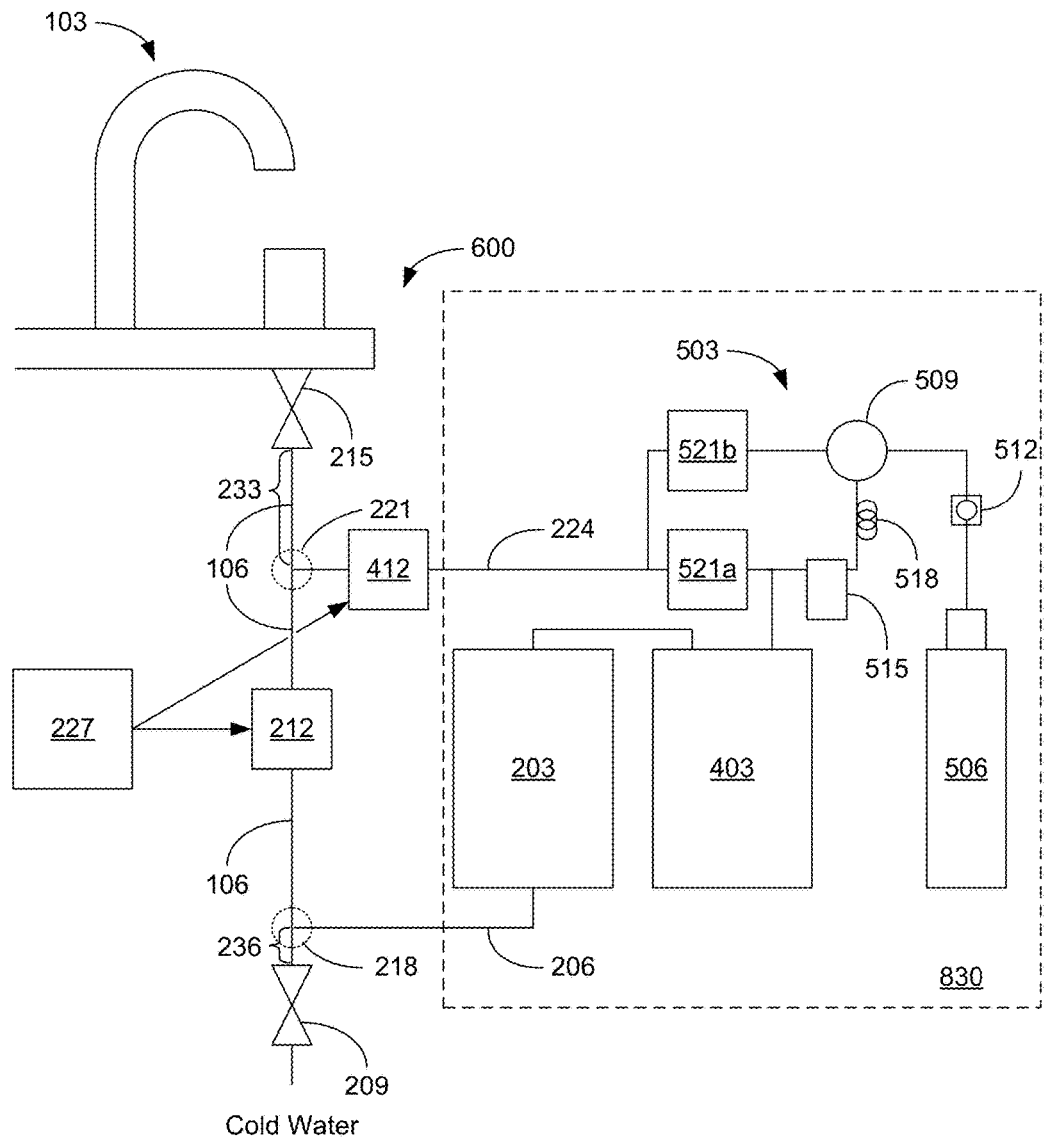
Figure 6D:
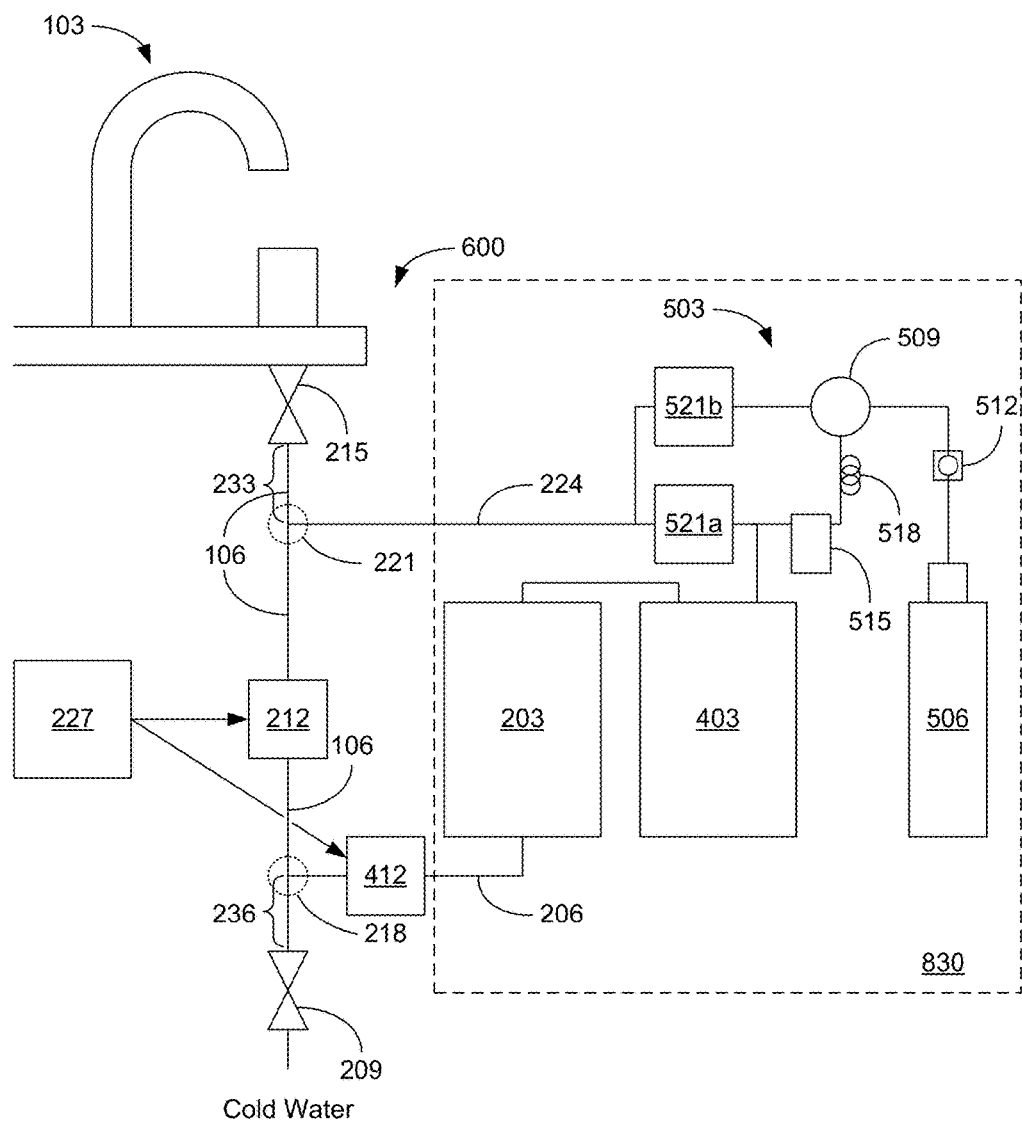

Referring to FIGS. 6A-6D, shown are smart water filter systems 600 comprising the smart water filter systems 200 of FIG. 3A-3D comprising a conditioning system 830 with a chiller unit 403 and a carbonation system 503 installed between the filter bank 203 and the cold water line 106. Operation of the smart water filter system 600 of FIG. 6A is consistent with that described with respect to FIGS. 4A and 5A. Operation of the solenoid valves 212, 521a and 521b, and the carbonator pump 515 is controlled by the control unit 227. As described with respect to the smart water filter system 400 of FIG. 4A, operation of the normally open solenoid valve 212 by the control unit 227 controls filtered water flow through the filter bank 203 and the chiller unit 403. Operation of the solenoid valves 521a and 521b, and the carbonator pump 515, to provide carbonated filtered water is controlled by the control unit 227. With the chiller unit 403 supplying the carbonation system 503, the cooling coils 518 may be eliminated from the carbonation system 503. The operation of the smart water filter systems 600 of FIGS. 6B-6D is consistent with that described with respect to FIGS. 4B-4D and 5B-5D.

Figure 7:
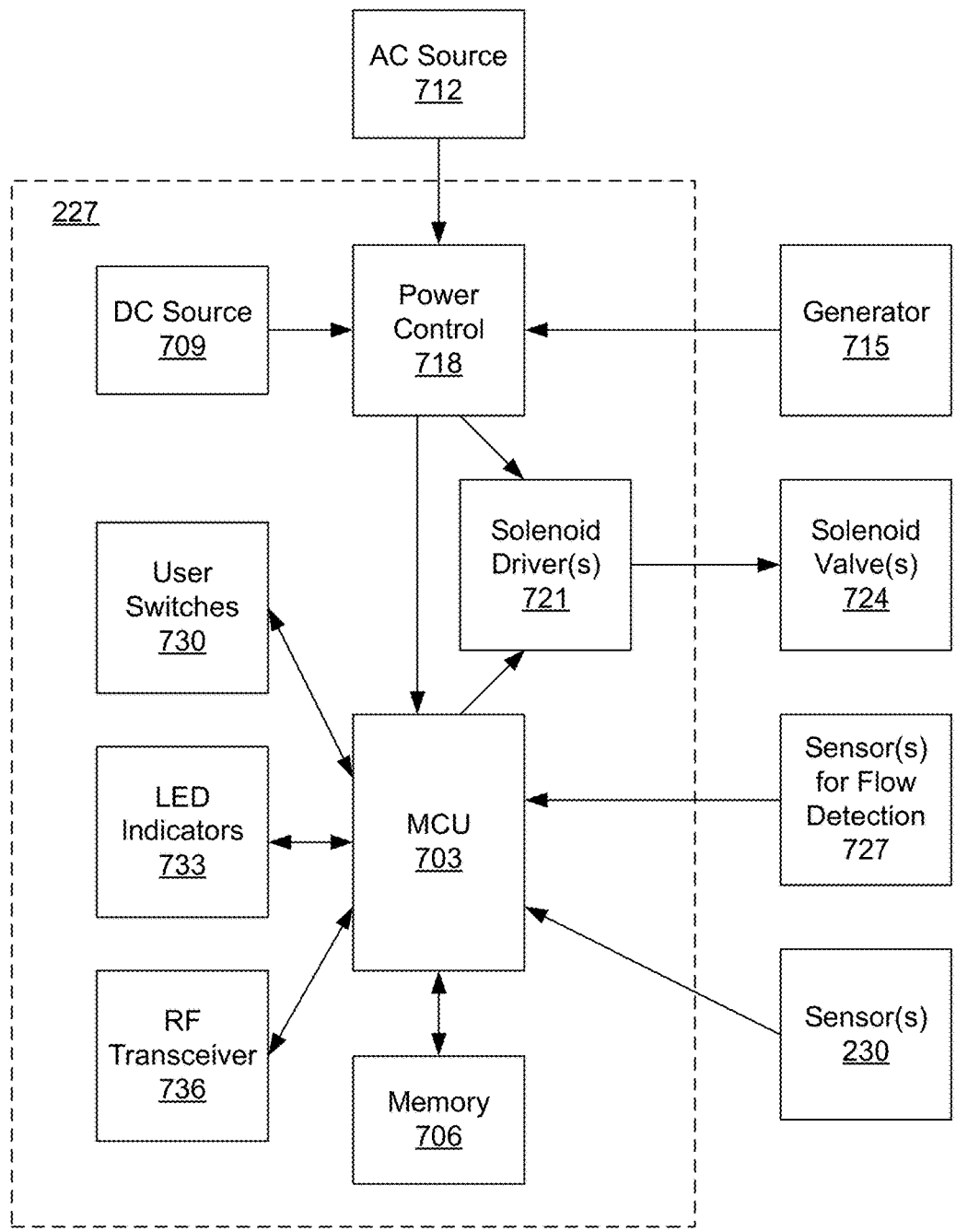
FIG. 7 is a graphical representation of an example of a control unit of the smart water filter system in accordance with various embodiments of the present disclosure.

Referring next to FIG. 7, shown is an example of the control unit 227 of the smart water filter system 200 (FIG. 2). In the example of FIG. 7, the control unit 227 includes a processor such as a microcontroller unit (MCU) 703 and memory 706. Power for the smart water filter system 200 can be provided by a DC source 709 (e.g., a battery), an AC source 712 (e.g., 110V household power), or a generator 715 (e.g., a micro-hydro generator). A power control 718 includes circuitry that interfaces with one or more power sources 709, 712 and/or 715, and controls monitoring and distribution of the power to components of the smart water filter system 200. For example, the power control 718 can be configured to provide low voltage power to the MCU 703, memory 706 and various other components through a power distribution bus.

The power control 718 may also be configured to provide a higher voltage to a solenoid driver 721 for energizing one or more solenoid valve 724 (e.g., solenoid 212, three-port solenoid valve 312, solenoid 412 and/or solenoid 521). In addition, the power control 718 can monitor one or more of the power sources 709, 712 and/or 715, and provide an indication of the condition of a power source 709, 712 and/or 715, to the MCU 703. For example, the power control 718 can monitor battery conditions such as voltage level and provide an indication to the MCU 703. In the case of the generator 715, the power control 718 can provide an indication to the MCU 703 that power is being produced by the generator 715. Such an indication can be used to indicate water flow through the water supply line.

Other sensors 727 can also be used to provide an indication of water flow such as, e.g., an in-line flow sensor, flow switch, temperature sensors and/or pressure sensors. The control unit 227 can also include switches 730 for user configuration of the smart water filter system 200 and indicators (e.g., LEDs) 733 to provide visual indications of the operational condition of the system. A radio frequency (RF) transceiver 736 can also be included in the control unit 227 to allow for wireless communication with a smart device (e.g., a laptop, tablet and/or smart phone) and/or for connection to a network for remote communications. The RF transceiver 736 can support wireless communication protocols such as, but not limited to, Wi-Fi, Bluetooth, Zigbee and/or NFC (near field communication).

As previously discussed, one or more sensors 230 can be used to activate one or more solenoid valve(s) 724 to dispense filtered water while water is flowing from the faucet. Sensors 230 include, but are not limited to magnetic proximity switches (e.g., reed switches and hall effect switches) that can be activated when a magnet comes in proximity of the switch, passive infrared (IR) sensors that can be activated when an object passes through the IR beam, ultrasonic sensors that can be activated when an object passes through the ultrasonic field, microwave sensors and/or tomographic sensors that can be activated when an object passes through the sensing field, photoelectric sensors that can be activated when an object breaks the beam, mechanical sensors that can be activated when a lever and/or cable is moved, electromechanical sensors such as a strain gauge, load cell, resistive bend or flex sensor, electromechanical (bump) switches and/or tilt switches, metal detectors using very low frequencies (VLF), pulse induction and/or beat frequency oscillator (BFO) detectors, capacitive sensing, RF identification (RFID), thermal detectors that can be activated by a specified temperature change, and/or sound detectors that can be activated by claps, taps or clicks, or voice detectors that can be activated by a voice command. A sensor 230 can be surface mounted above or on the counter top or top of the sink, can be mounted below the counter top or sink (e.g., in the cabinet) and/or can be integrated into a component of the sink such as, e.g., the faucet, soap dispenser or other sink/counter top fixture. The sensor 230 can be communicatively coupled to the control unit 227 though a hard wire connection or through a wireless connection. For example, the sensor may communicate with the MCU 703 of the control unit 227 via the RF transceiver 736.

Various examples of sensors 230 will now be discussed with respect to FIGS. 8A-8K. As can be understood, individual sensors 230 or combinations of sensors 230 can be used to initiate the provision of filtered water through the faucet using a conditioning system 830 comprising, e.g., a filter bank 203, a chiller unit 403 and/or carbonation system 503 (for example, see FIGS. 2A-6D). While the examples of FIGS. 8A-8K illustrate the control unit 227 controlling water flow through the water conditioning system 830 using a single solenoid valve 212 as discussed with respect to FIGS. 3A, 4A, 5A and 6A; other flow control implementations are equally possible. For example, the control unit 227 can control the water flow using a three-port solenoid valve 312 as illustrated in FIGS. 3B, 4B, 5B and 6B or two solenoid valves 212 and 412 as illustrated in FIGS. 3C, 4C, 5C and 6C or FIGS. 3D, 4D, 5D and 6D.

Figure 8A:
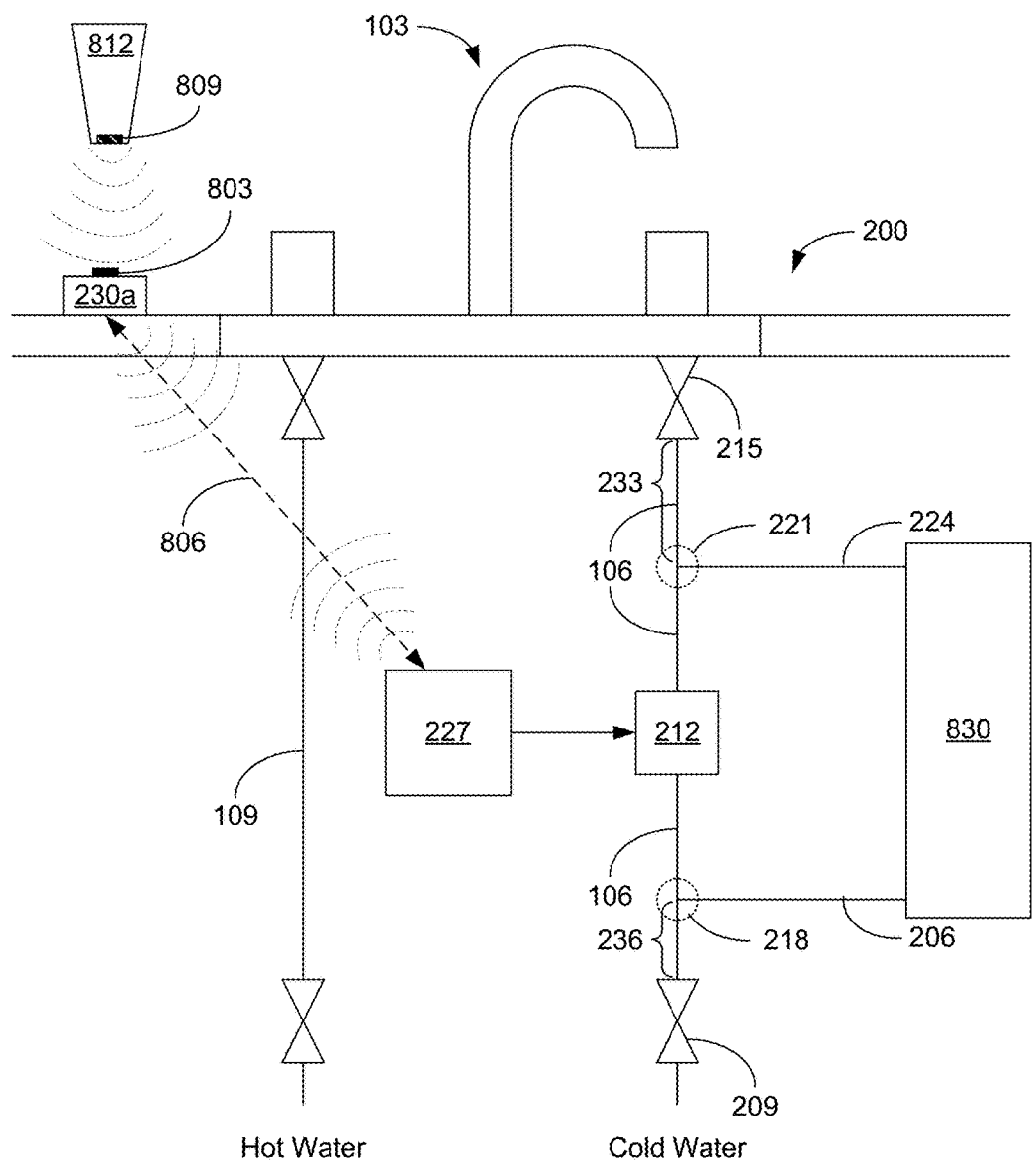
FIGS. 8A through 8K are examples of sensors that can be utilized to initiate the provision of filtered water by the smart water filter system in accordance with various embodiments of the present disclosure.

FIG. 8A shows an example of an above sink/counter sensor 230a comprising a magnetic proximity switch (e.g., a reed switch or a Hall Effect switch) and a manual tactile push button switch 803. In other embodiments, only a magnetic proximity switch or a manual tactile push button switch may be included. Either switch, when actuated, will cause the sensor 230a to communicate a signal to the control unit 227 to initiate provision of filtered water, refrigerated water, and/or an amount of carbonation, flavor, and/or additive through the faucet if water is flowing. The signal can be communicated to the control unit 227 through a wireless connection 806, as illustrated in FIG. 8A, or via a wired connection. As can be understood, the tactile push button switch 803 is activated when manually depressed. In contrast, the magnetic proximity switch is activated when a magnet such as the magnet 809 in a container 812 (e.g., a drinking glass, cup, pitcher, etc.) is placed proximate to the reed switch or Hall Effect switch in the sensor 230a. The reed switch is closed by the magnet to actuate the sensor 230a and the Hall Effect switch produces a voltage change in response to the presence of the magnetic field. Power for the sensor 230a can be provided by an internal battery, a wired power connection, or other appropriate power supply.

Figure 8B:
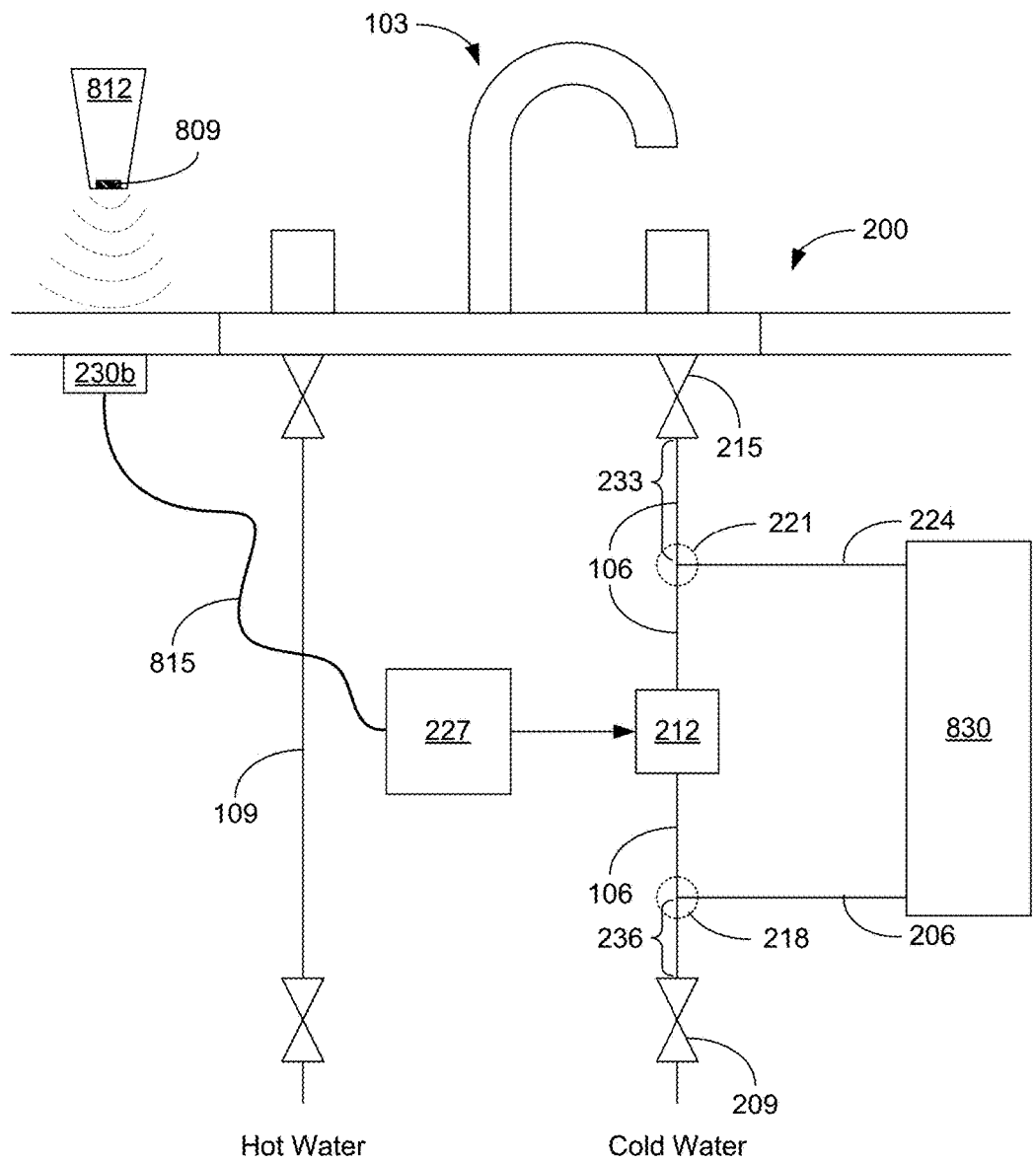

FIG. 8B shows an example of a below sink/counter sensor 230b comprising a magnetic proximity switch (e.g., a reed switch or a Hall Effect sensor). The magnetic proximity switch is activated when a magnet such as the magnet 809 in a container 812 (e.g., a drinking glass, cup, pitcher, etc.) is placed proximate to the reed switch or Hall Effect switch in the sensor 230b. The magnetic proximity switch, when actuated, will cause the sensor 230b to communicate a signal to the control unit 227 to initiate provision of filtered water, refrigerated water, and/or an amount of carbonation, flavor, and/or additive through the faucet. The signal can be communicated to the control unit 227 through a wireless connection 806 (FIG. 8A) or via a wired connection 815, as illustrated in FIG. 8B. In some embodiments, an additional above sink/counter manual tactile push button switch, which can separately communicate with the control unit 227, may be included. Power for the sensor 230b can be provided by an internal battery, a wired power connection, or other appropriate power supply.

Figure 8C:
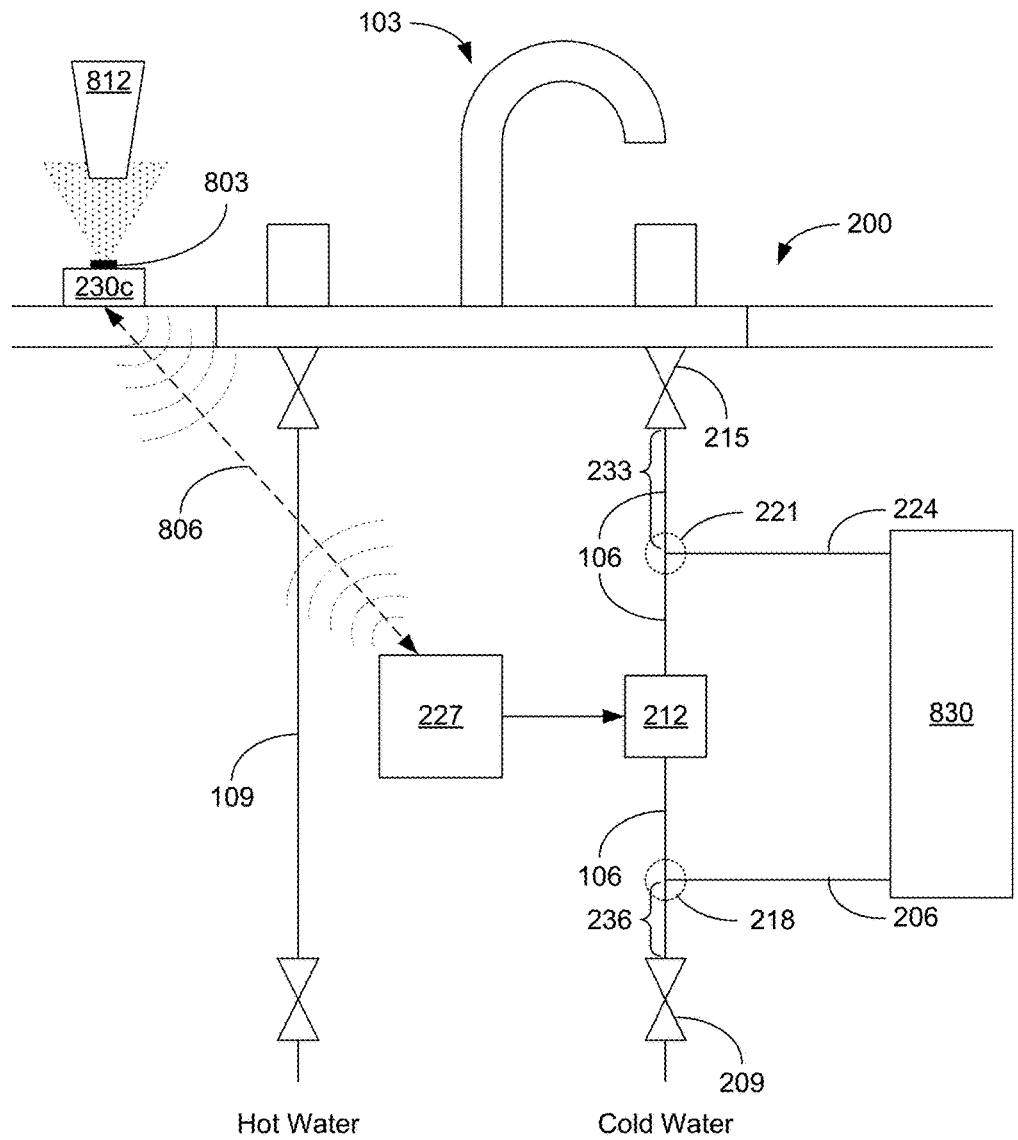

FIG. 8C shows an example of an above sink/counter sensor 230c comprising a passive IR proximity switch. The passive IR proximity switch includes a solid state device that is activated when an object such as a container 812 (e.g., a drinking glass, cup, pitcher, etc.) or hand moves into the IR sensing field. No specific material or other communication device is needed to actuate the passive IR proximity switch. The sensor 230c can also include a manual tactile push button switch 803. As previously discussed, the tactile push button switch 803 is activated when manually depressed. The passive IR proximity switch, when actuated, will cause the sensor 230c to communicate a signal to the control unit 227 to initiate provision of filtered water, refrigerated water, and/or an amount of carbonation, flavor, and/or additive through the faucet. The signal can be communicated to the control unit 227 through a wireless connection 806, as illustrated in FIG. 8C, or via a wired connection 815 (FIG. 8B). Power for the sensor 230c can be provided by an internal battery, a wired power connection, or other appropriate power supply. While the example of FIG. 8C shows an above sink/counter sensor 230c, other implementations can include a below sink/counter sensor 230c configured with the IR sensing field projecting through the sink/counter in a similar fashion.

Figure 8D:
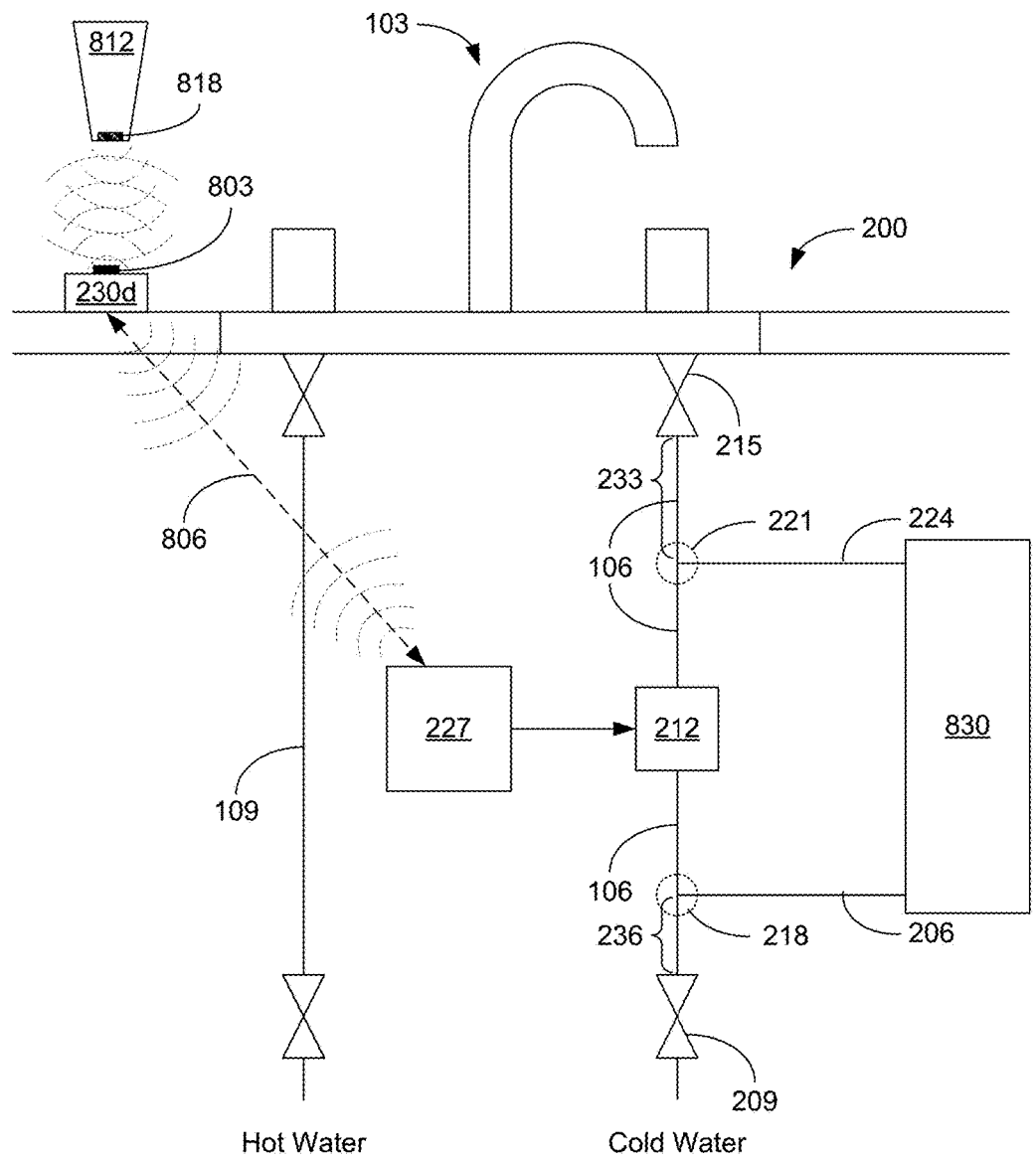

FIG. 8D shows an example of an above sink/counter sensor 230d comprising an RFID switch. The RFID switch includes a solid state device that is activated when an object such as a container 812 (e.g., a drinking glass, cup, pitcher, etc.) is identified using RF identification. The RFID switch is activated when an RFID such as the chip 818 in a container 812 (e.g., a drinking glass, cup, pitcher, etc.) responds to an RF query from the sensor 230d. The sensor 230d can also include a manual tactile push button switch 803. As previously discussed, the tactile push button switch 803 is activated when manually depressed. The RFID switch, when actuated, will cause the sensor 230d to communicate a signal to the control unit 227 to initiate provision of filtered water, refrigerated water, and/or an amount of carbonation, flavor, and/or additive through the faucet. The signal can be communicated to the control unit 227 through a wireless connection 806, as illustrated in FIG. 8D, or via a wired connection 815 (FIG. 8B). Power for the sensor 230d can be provided by an internal battery, a wired power connection, or other appropriate power supply. While the example of FIG. 8D shows an above sink/counter sensor 230d, other implementations can include a below sink/counter sensor 230d configured to operate in a similar fashion.

Figure 8E:
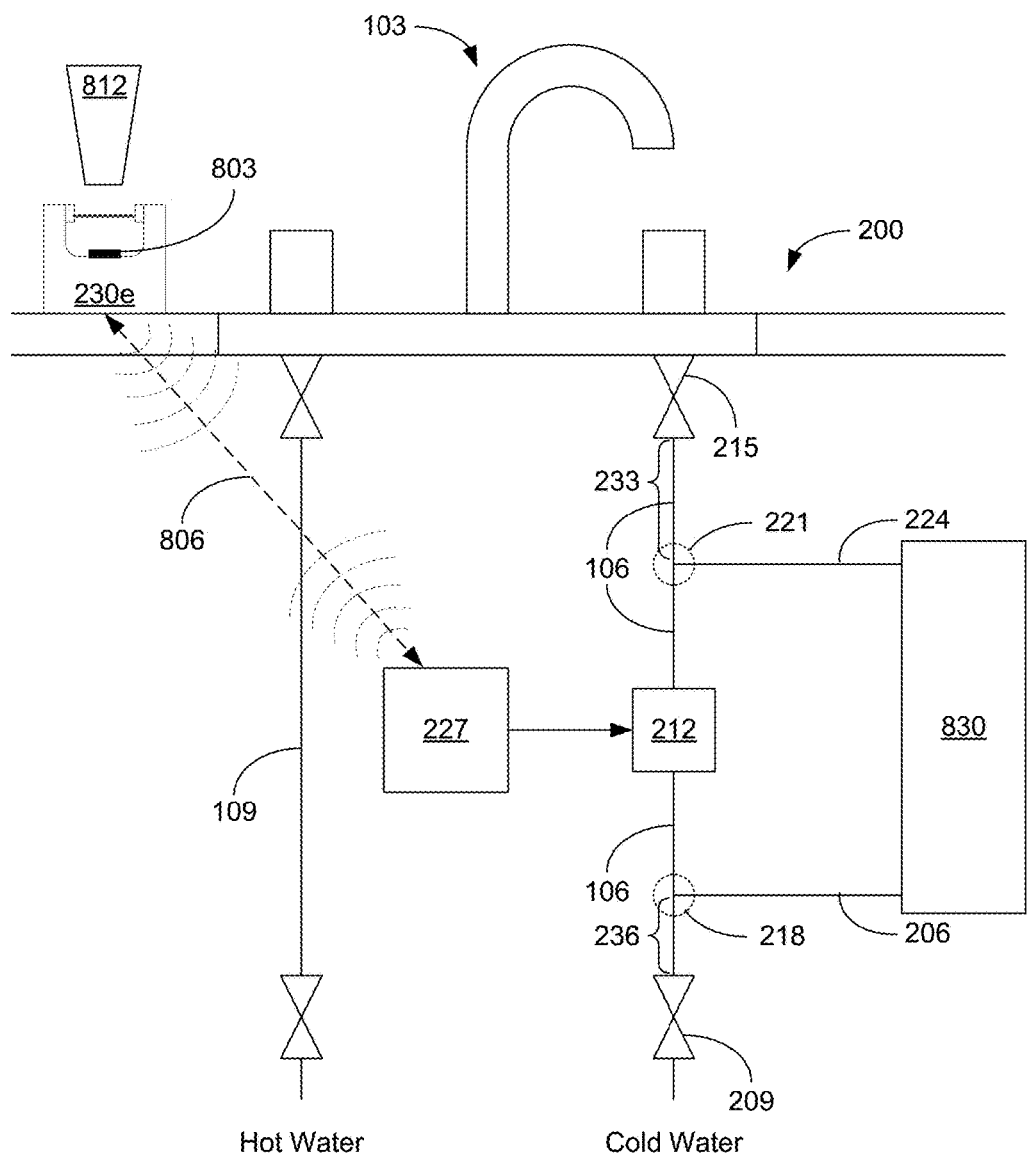

FIG. 8E shows an example of an above sink/counter sensor 230e comprising a photoelectric sensing beam switch. The photoelectric sensing beam switch includes a solid state device that projects a sensing beam of light towards a photoelectric sensor. The photoelectric sensing beam switch is activated when an object such as a container 812 (e.g., a drinking glass, cup, pitcher, etc.) or hand disrupts or breaks the sensing beam. No specific material or other communication device is needed to actuate the photoelectric sensing beam switch. The sensor 230e can also include a manual tactile push button switch 803. As previously discussed, the tactile push button switch 803 is activated when manually depressed. The photoelectric sensing beam switch, when actuated, will cause the sensor 230e to communicate a signal to the control unit 227 to initiate provision of filtered water, refrigerated water, and/or an amount of carbonation, flavor, and/or additive through the faucet. The signal can be communicated to the control unit 227 through a wireless connection 806, as illustrated in FIG. 8D, or via a wired connection 815 (FIG. 8B). Power for the sensor 230e can be provided by an internal battery, a wired power connection, or other appropriate power supply.

Figure 8F:
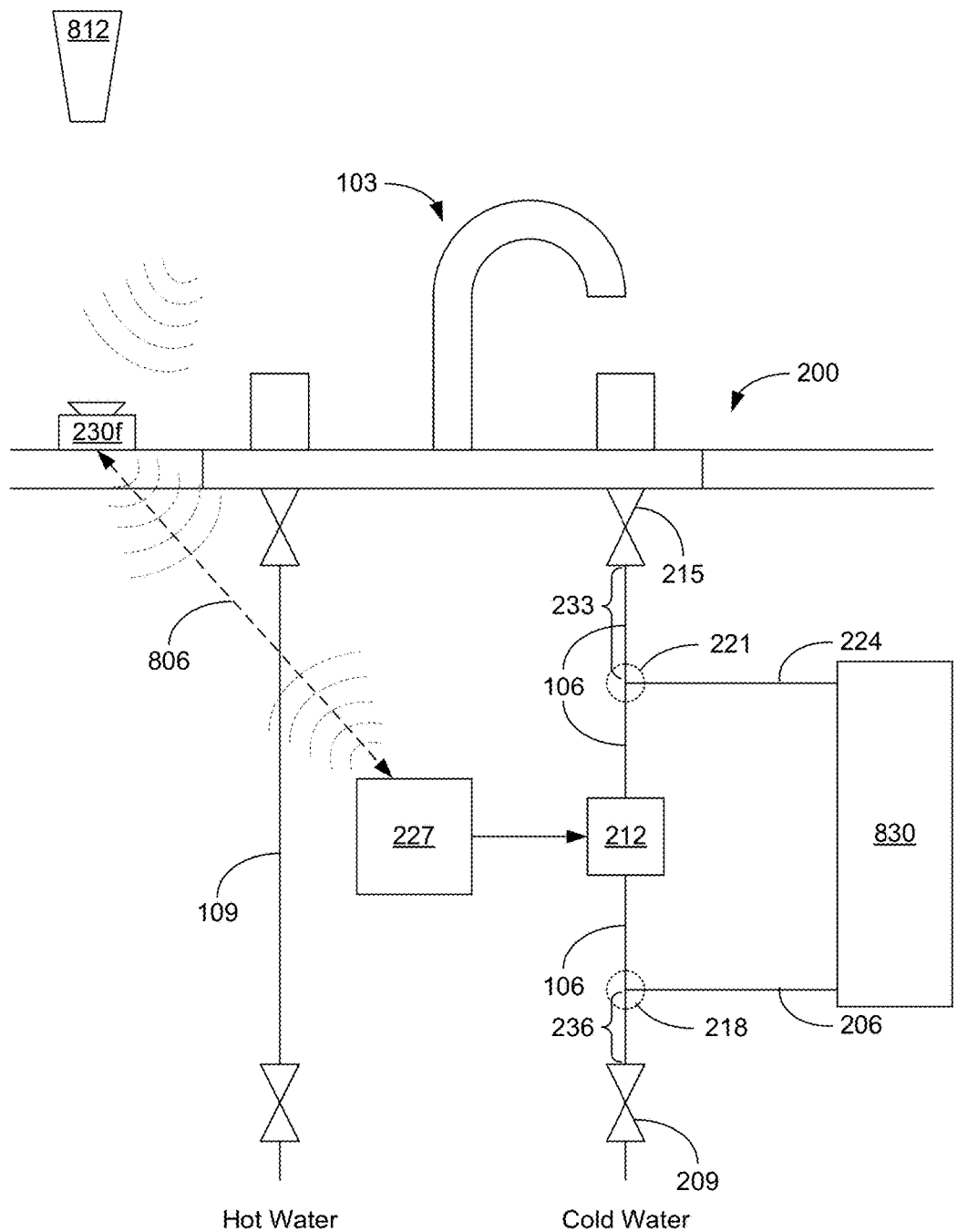

FIG. 8F shows an example of an above sink/counter sensor 230f comprising a voice sensing switch. The voice sensing switch is activated when a voice, word or phrase is recognized by processing circuitry in the sensor 230f. The sensor 230f can also include a manual tactile push button switch 803 (not shown in FIG. 8F). As previously discussed, the tactile push button switch 803 is activated when manually depressed. The voice sensing switch, when actuated, will cause the sensor 230f to communicate a signal to the control unit 227 to initiate provision of filtered water, refrigerated water, and/or an amount of carbonation, flavor, and/or additive through the faucet. The signal can be communicated to the control unit 227 through a wireless connection 806, as illustrated in FIG. 8F, or via a wired connection 815 (FIG. 8B). Power for the sensor 230f can be provided by an internal battery, a wired power connection, or other appropriate power supply.

Figure 8G:
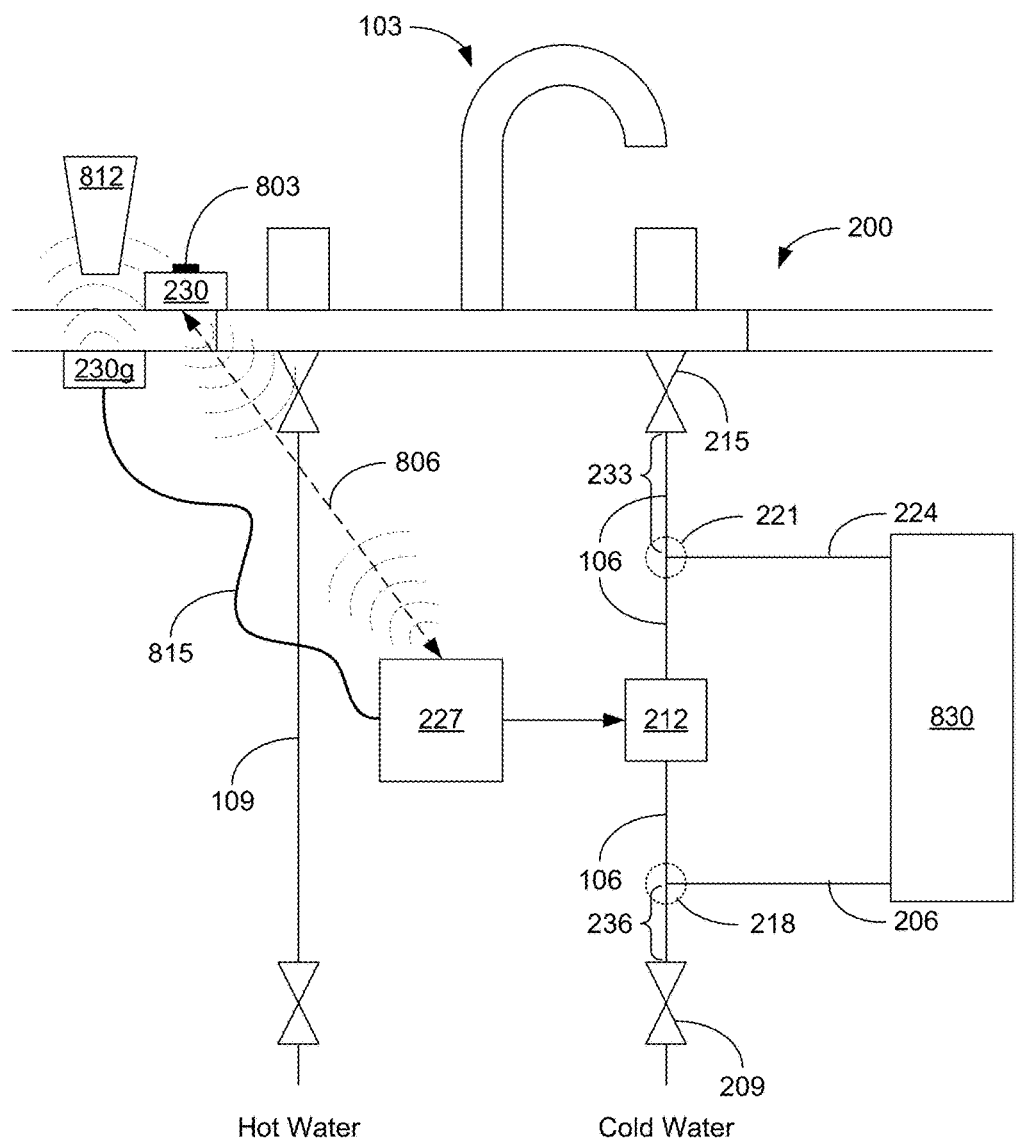

FIG. 8G shows an example of a below sink/counter sensor 230g comprising a capacitive proximity switch. The capacitive proximity switch includes a solid state device that senses changes in capacitance when object approach the sensor 230g. The capacitive proximity switch is activated when an object such as a container 812 (e.g., a drinking glass, cup, pitcher, etc.) is placed proximate to the sensor 230g, thereby changing the capacitance. The capacitive proximity switch, when actuated based upon a comparison of the sensed capacitance with a defined limit, will cause the sensor 230g to communicate a signal to the control unit 227 to initiate provision of filtered water, refrigerated water, and/or an amount of carbonation, flavor, and/or additive through the faucet. The signal can be communicated to the control unit 227 through a wireless connection 806 or via a wired connection 815, as illustrated in FIG. 8G. In some embodiments, an additional above sink/counter sensor 230 with a manual tactile push button switch 803, and which can separately communicate with the control unit 227, may be included. Power for the sensor 230g can be provided by an internal battery, a wired power connection, or other appropriate power supply. While the example of FIG. 8G shows a below sink/counter sensor 230g, other implementations can include an above sink/counter sensor 230g configured with the capacitive proximity switch in a similar fashion.

Figure 8H:
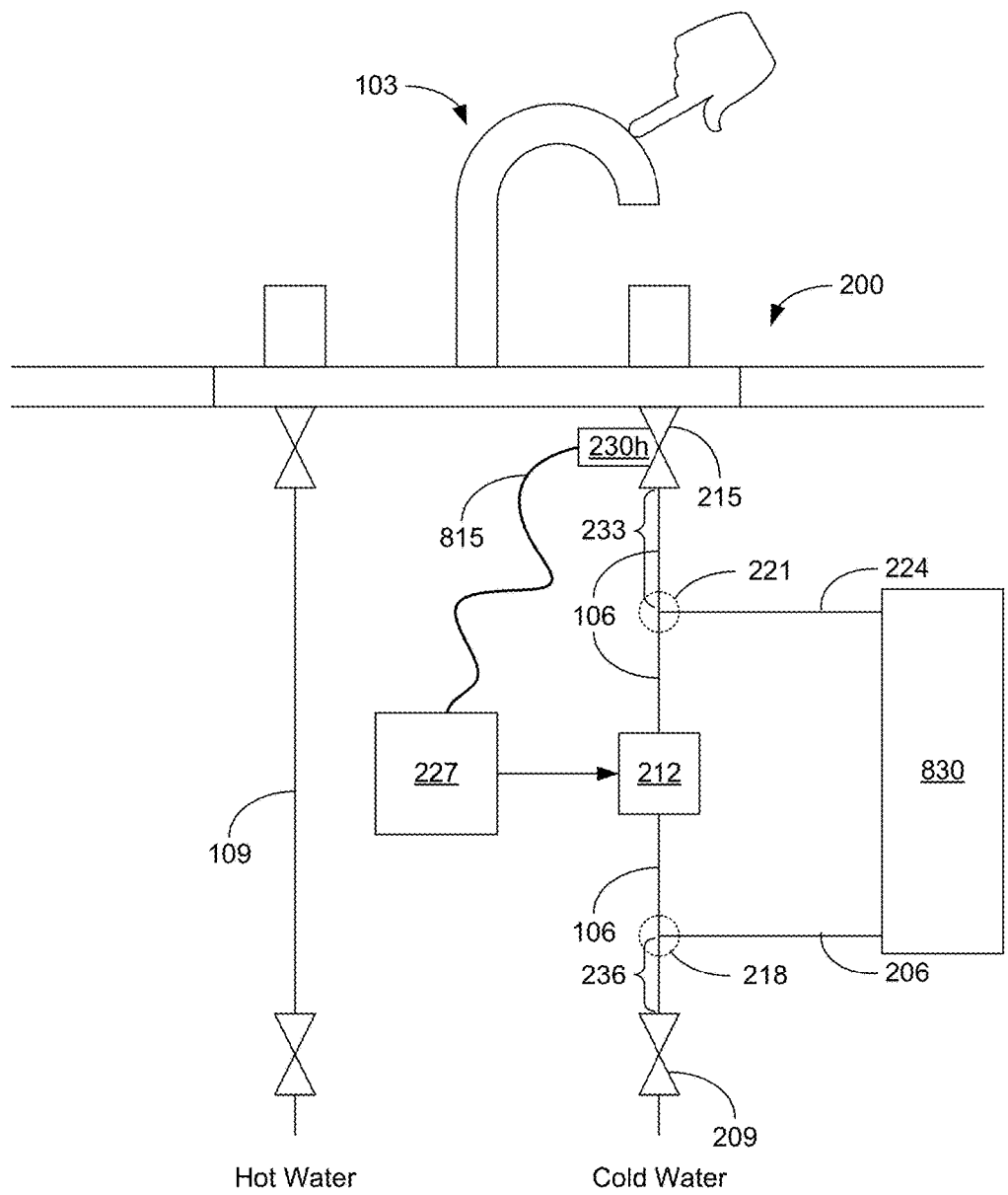

Other types of capacitive touch sensors can also be utilized by the smart water filter system 200. FIG. 8H shows an example of a capacitive touch sensor 230h that utilizes the faucet as a portion of the sensing circuit. In the example of FIG. 8H, the capacitive touch sensor 230h is mounted to the cold water inlet fitting of the faucet 103. The capacitive touch sensor 230h includes a solid state device that senses changes in capacitance when the faucet 103 is touched. The capacitive touch sensor 230h is activated when a sufficient change in the capacitance is sensed. In some implementations, a defined sequence or pattern of touches can be used to actuate the capacitive touch sensor 230h. The capacitive touch sensor 230h, when actuated based upon a comparison of the sensed capacitance with a defined limit, will cause the sensor 230h to communicate a signal to the control unit 227 to initiate provision of filtered water, refrigerated water, and/or an amount of carbonation, flavor, and/or additive through the faucet. The signal can be communicated to the control unit 227 through a wireless connection 806 (FIG. 8A) or via a wired connection 815, as illustrated in FIG. 8H. Power for the sensor 230h can be provided by an internal battery, a wired power connection, or other appropriate power supply. In some embodiments, the capacitive touch sensor 230h can be an above sink/counter sensor that is mounted to a portion of the faucet 103 above the counter. For example, the capacitive touch sensor 230h can be coupled to the faucet and positioned on the counter between the faucet and a back splash behind the faucet 103.

Figure 8I:
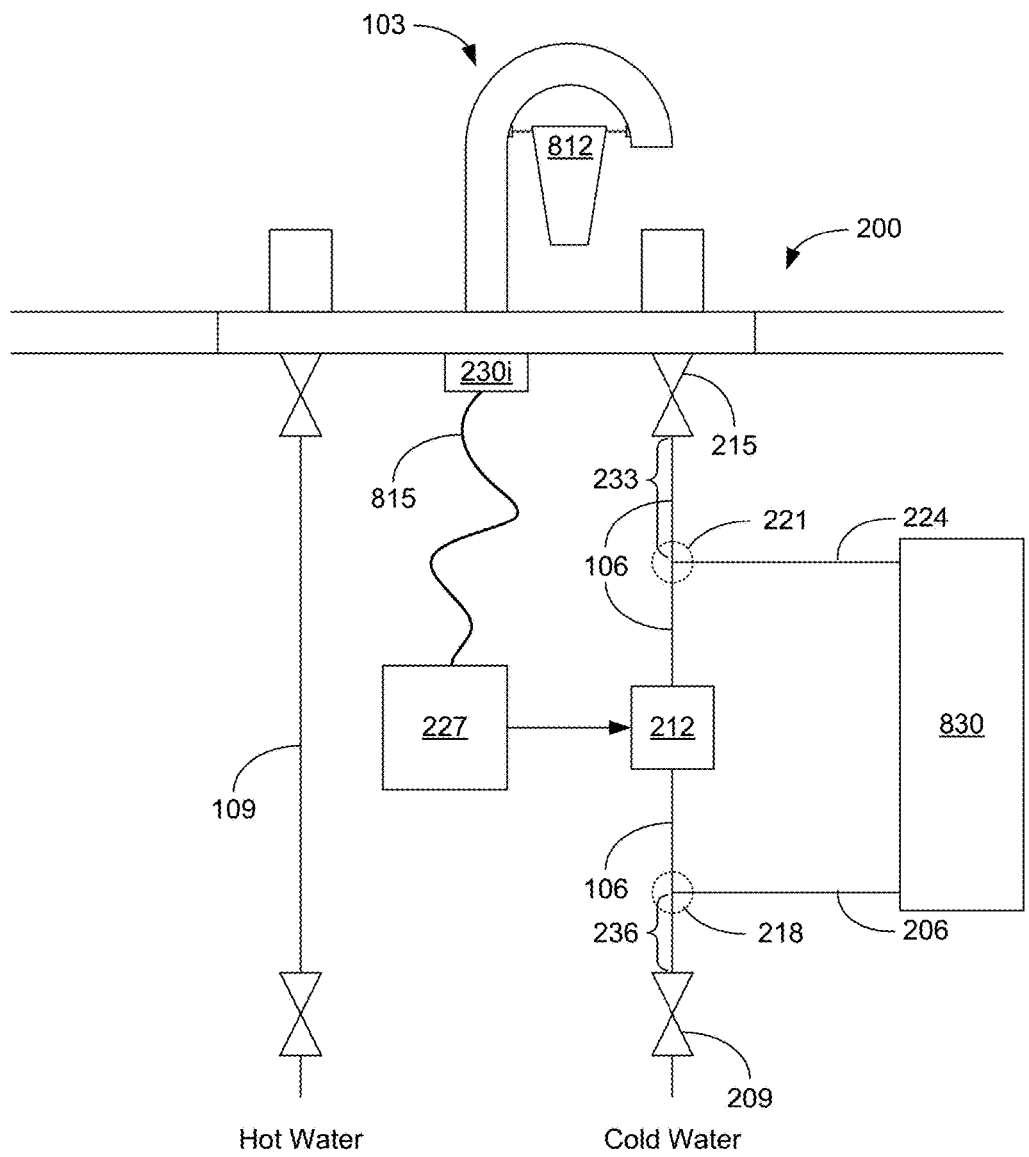

In some embodiments, sensors can be integrated in the faucet 103. FIG. 8I shows an example of a faucet 103 integrated with a sensor 230i including a photoelectric sensing beam switch. In the example of FIG. 8I, the faucet 103 includes a solid state device that projects a sensing beam of light from a source towards a photoelectric sensor, which are located on the front and back of the faucet spout. In other embodiments, the sensing beam and photoelectric sensor can be located in different orientations and/or positions on the faucet 103. The photoelectric sensing beam switch is activated when an object such as a container 812 (e.g., a drinking glass, cup, pitcher, etc.) or hand disrupts or breaks the sensing beam. No specific material or other communication device is needed to actuate the photoelectric sensing beam switch. In some implementations, a defined sequence or pattern of breaks can be used to actuate the sensor 230i. In some embodiments, an additional above sink/counter sensor 230 with a manual tactile push button switch 803 (FIG. 8A), and which can separately communicate with the control unit 227, may be included. The photoelectric sensing beam switch, when actuated, will cause the sensor 230i to communicate a signal to the control unit 227 to initiate provision of filtered water, refrigerated water, and/or an amount of carbonation, flavor, and/or additive through the faucet. The signal can be communicated to the control unit 227 through a wireless connection 806 (FIG. 8A) or via a wired connection 815, as illustrated in FIG. 8I. Power for the sensor 230i can be provided by an internal battery, a wired power connection, or other appropriate power supply.

Figure 8J:
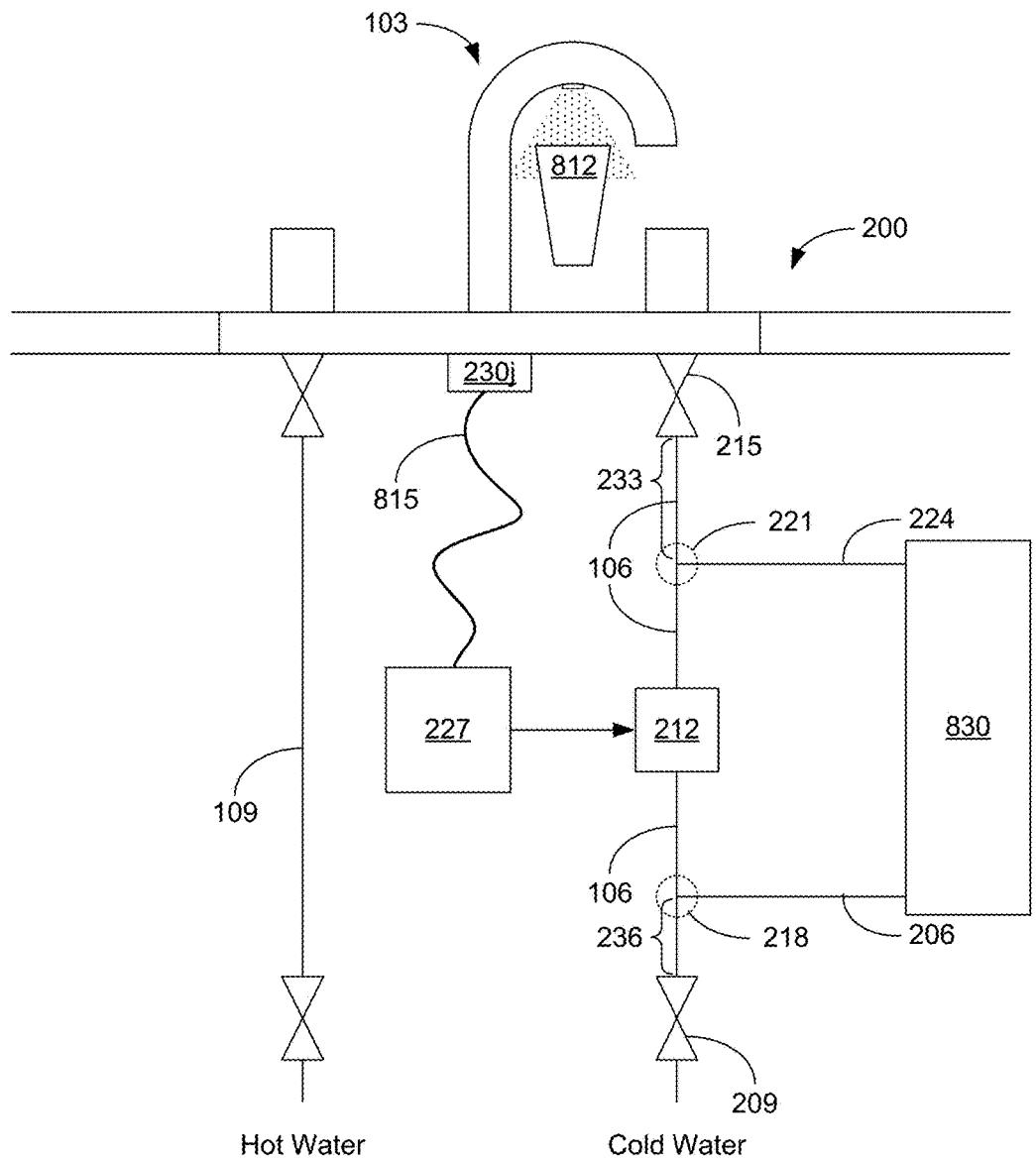

FIG. 8J shows an example of a faucet 103 integrated with a sensor 230j including a passive IR proximity switch. In the example of FIG. 8J, the faucet 103 includes a solid state device that projects an IR sensing field under the faucet spout. In other embodiments, the IR sensing field can be located in different orientations and/or positions on the faucet 103. The passive IR proximity switch is activated when an object such as a container 812 (e.g., a drinking glass, cup, pitcher, etc.) or hand moves into the IR sensing field. No specific material or other communication device is needed to actuate the photoelectric sensing beam switch. In some implementations, a defined sequence or pattern of movements through the IR sensing field can be used to actuate the sensor 230j. In some embodiments, an additional above sink/counter sensor 230 with a manual tactile push button switch 803 (FIG. 8A), and which can separately communicate with the control unit 227, may be included. The passive IR proximity switch, when actuated, will cause the sensor 230j to communicate a signal to the control unit 227 to initiate provision of filtered water, refrigerated water, and/or an amount of carbonation, flavor, and/or additive through the faucet. The signal can be communicated to the control unit 227 through a wireless connection 806 (FIG. 8A) or via a wired connection 815, as illustrated in FIG. 8J. Power for the sensor 230j can be provided by an internal battery, a wired power connection, or other appropriate power supply.

Figure 8K:
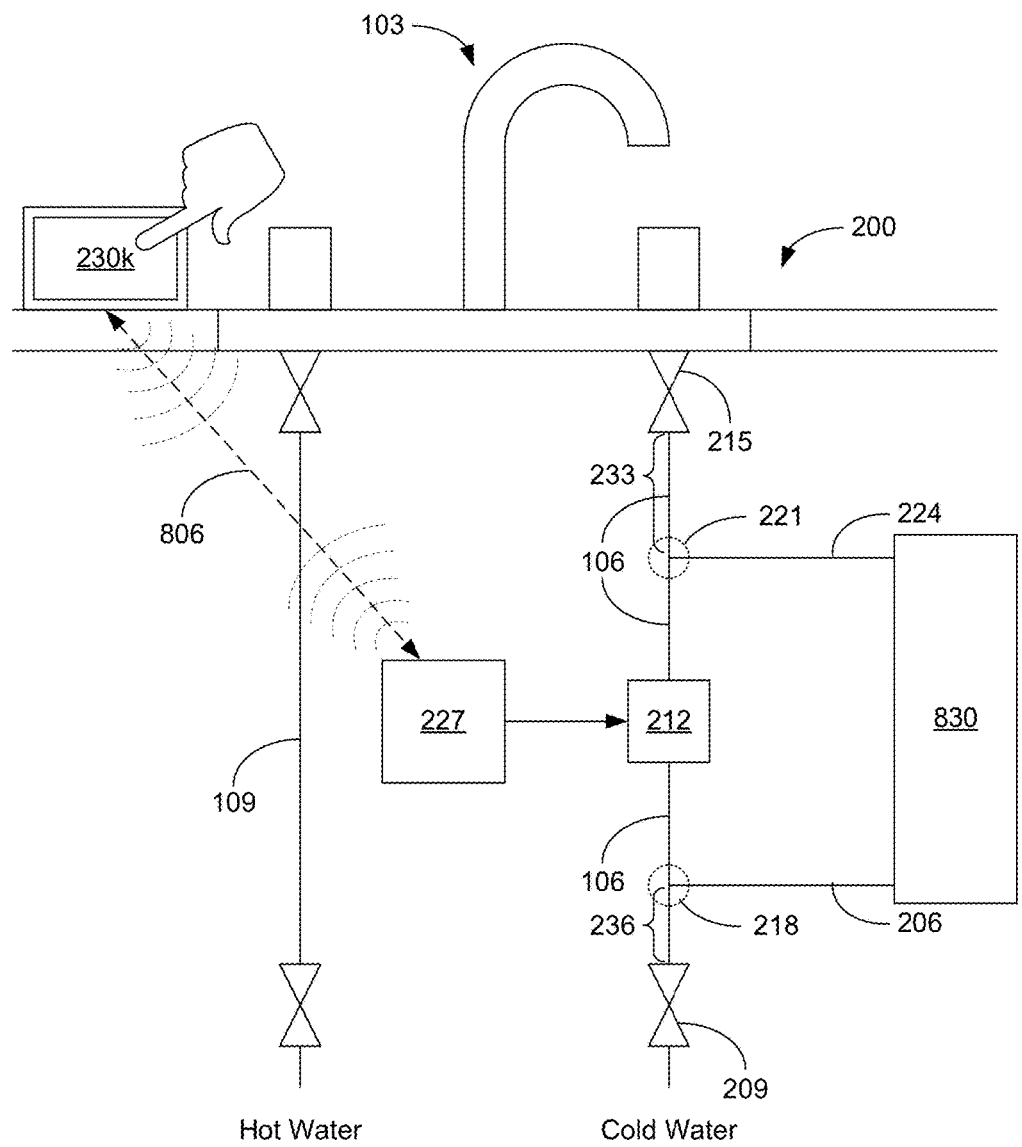

FIG. 8K shows an example of an above sink/counter touch screen sensor 230k. The touch screen sensor 230k can be activated by selecting the appropriate option through the touch screen. The touch screen sensor 230k, when actuated, will communicate a signal to the control unit 227 to initiate provision of filtered water, refrigerated water, and/or an amount of carbonation, flavor, and/or additive through the faucet. The signal can be communicated to the control unit 227 through a wireless connection 806, as illustrated in FIG. 8K, or via a wired connection 815. Power for the sensor 230k can be provided by an internal battery, a wired power connection, or other appropriate power supply. While the example of FIG. 8K shows a touch screen sensor 230k on the counter, the touch screen sensor 230k can be mounted in other locations in other implementations as can be appreciated. In some embodiments, the sensor 230k can include a touch sensor that reads the person's hydration level and provides feedback to the person via sensor 230k or via wireless communication with a smart device such as, but not limited to, a laptop, tablet, smart phone, personal monitoring device that can be worn, and/or other device having an appropriate app.

In some embodiments, patterns in water flow through the faucet can be monitored to identify when the smart water filtering system should be activated. The flow sensor can be used to monitor the variations in water flow through the cold water line 106 for identifiable patterns that can be used to initiate operation of the smart water filter system 200. For example, when water flow is first established at or above a first defined level (e.g., at or above 95% of full flow through the faucet 103) or to full flow, and then reduced to at or below a second defined level (e.g., at or below 50% of full flow) within a predefined time period, then the control unit 227 can initiate provision of filtered water, refrigerated water, and/or an amount of carbonation, flavor, and/or additive through the faucet 103. The control unit 227 can learn the amount of water flow that corresponds to full flow through the faucet during the initial installation and setup of the smart water filter system 200. The control unit 227 may send a signal to a sensor 230 above the counter to provide an indication to the user that the filtering (or other function) has been initiated. For example, the touch screen sensor 230k of FIG. 8K can display a message (or a light may be activated on a sensor 230 of FIGS. 8A-8K) in response to the signal from the control unit 227. The smart water filter system 200 (or solenoid valve 212) can be deactivated when the water flow through the cold water line 106 is subsequently shut off or when the water flow is subsequently increased to or above the first defined level (or to full flow).

In some implementations, the control unit 227 can include controls (or applications) for monitoring and/or personalization of the operation of the smart water filter system 200. For example, the control unit 227 can monitor usage of, e.g., the filter bank 203, $CO_2$ canister 506 and/or chiller unit 403 to provide maintenance feedback to the user, maintenance personnel and/or equipment supplier. For instance, indications can be provided to replace a filter and/or $CO_2$ canister based upon monitored usage of the smart water system 200, through LED indicators 733 on the control unit 227 (FIG. 7), the screen of the touch screen sensor 230k, or other appropriate user interface. In addition, indications can be provided for operating conditions such as, but not limited to, pressure differential across the filter bank 203, output pressure of the $CO_2$ canister 506, or input and/or output temperature of the chiller unit 403. Such conditions can be displayed on or accessible through the screen of the touch screen sensor 230k and/or through a user interface of the control unit 227. The user interface can be integrated into the control unit 227 or may be remotely located and communicatively coupled to the control unit 227 through the RF transceiver 736 (FIG. 7). For instance, a remotely located or collocated computer, laptop, tablet, smart phone can interface with the control unit 227 to access and/or provide indications to the user, maintenance personnel and/or equipment supplier.

The RF transceiver 736 can allow access to the Internet through a local network (e.g., LAN, WLAN, near field communication, etc.) or may be configured to operate transmit and/or receive communications through a cellular network. Access to the Internet can also allow the smart water filter system 200 to display to the user notifications from the equipment supplier or other entities such as, e.g., the local municipality. For example, water safety notifications can be displayed on the screen of the touch screen sensor 230k and/or through the user interface of the control unit 227. Condition of replaceable components (e.g., filters and/or $CO_2$ canisters) and/or prompts for replacing and/or ordering replacement components can also be provided through the screen of the touch screen sensor 230k and/or through the user interface of the control unit 227. In some cases, replacement components (e.g., filters and/or $CO_2$ canisters) can be automatically ordered by the smart water filter system 200 and delivered to the user for replacement. In some cases, the control unit 227 may also be remotely accessed by the equipment supplier through the RF transceiver 736 to check the condition of and/or update the controls of the smart water filter system 200.

Operation of the smart water filter system 200 can also be personalized based upon the identification of the object, container and/or defined sequence or pattern of touches, breaks or movements. For example, users can have individual drinking glasses that are associated with a set of user defined preferences regarding the filtered (and/or chilled and/or carbonated, etc.) water. Once identified, the control unit 227 can configure and/or operate the smart water filter system 200 to provide filtered water that meets the specified preferences. The control unit 227 can also adjust the rate of flow and/or the amount of filtered water provided by the smart water filter system 200 based upon the identified container. The set of user defined preferences may be defined through the touch screen sensor 230k and/or through the user interface of the control unit 227. Monitoring of use and/or consumption of water can also be monitored based upon identification of the container and/or user. For instance, indications can be provided for the amount of water consumed over a given period of time.

Figure 9:
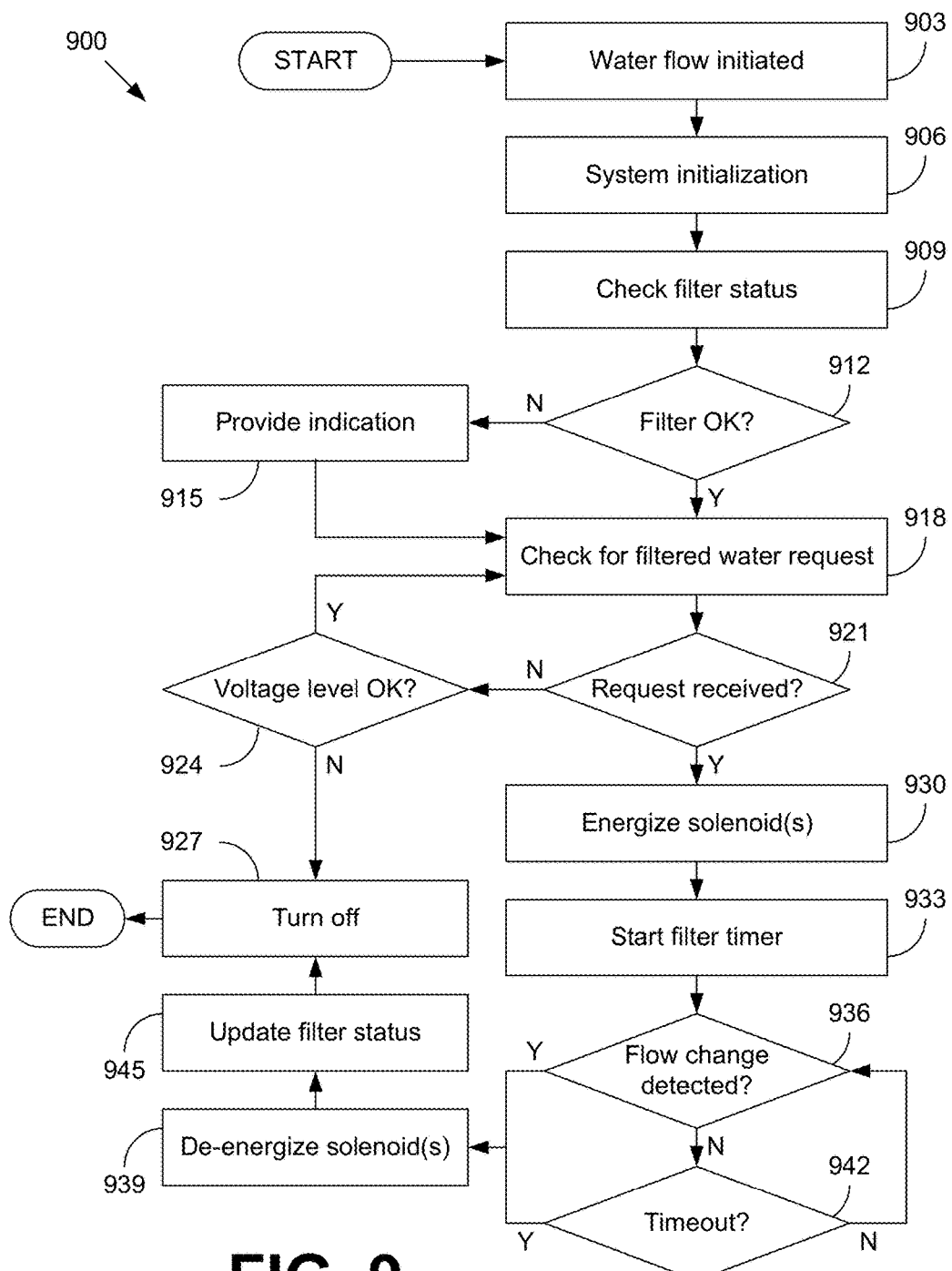
FIG. 9 is a flow diagram illustrating an example of operation of the smart water filter system in accordance with various embodiments of the present disclosure.

Referring now to FIG. 9, shown is a flow chart 900 illustrating an example of operation of a smart water filter system 200 of FIGS. 2A and 3A-3D. While the discussion makes reference to smart water system 200, the operation is equally applicable to smart water filter systems 400 of FIGS. 4A-4D, 500 of FIGS. 5A-5D or 600 of FIGS. 6A-6D. Beginning with 903, the smart water filter system 200 waits for initiation of water flow through the water supply line (e.g., cold water supply line 106 of FIGS. 2A-6D and 8A-8K). In some embodiments, the smart water filter system 200 is energized (or in a sleep mode) and monitoring on a periodic basis for water flow through one or more sensors as previously discussed. When flow is sensed by the control unit 227 (e.g., FIG. 3A), the smart water filter system 200 can initialize filtering operation in 906 and begin monitoring for signals from the sensor 230 (e.g., FIG. 3A). When in a sleep mode, the smart water filter system 200 can wake up and restore the system for normal operation in 906. In other embodiments, the smart water filter system 200 may be shut down with an idle generator in the water supply line. When the generator begins producing power (indicating that water flow has started), the smart water filter system 200 starts up for normal operation in 906.

The status of the filter bank 203 (e.g., FIG. 3A) is checked in 909. For example, the filters may be designed for use for a predefined period of time or amount of water flow through the filter. The operating time and/or amount of flow through of the filters can be monitored and checked to determine if they need to be replaced. If the filter condition is not acceptable at 912, then an indication can be provided in 915. For example, an indication can be provided through the LED indication on the control unit 227, through the screen of the touch screen sensor 230k and/or through the user interface of the control unit 227. In some cases, an indication may be transmitted by the control unit 227 to a remotely located or collocated computer, laptop, tablet, smart phone through a local network or connection, or through the Internet. The smart water filter system 200 then begins checking for a filtered water request from a sensor 230 in 918. If the filter condition is acceptable at 912, the smart water filter system 200 then begins checking for the filtered water request in 918.

If a filtered water request is not received from a sensor 230 by the control unit 227 within a predefined time period at 921, then the voltage level (or condition) of the battery used by the smart water filter system 200 can be checked in 924. If the voltage is acceptable, then the flow returns to 918, where the smart water filter system 200 continues to check for a filtered water request. If the voltage level of the battery is not acceptable, then the smart water filter system 200 may proceed to 927 and turn off (or enter a sleep mode to conserve power). An indication can be provided to the user in 927 to inform them of the reason for shutting down the system. If a filtered water request is received by the control unit 227 at 921, then one or more solenoids can be energized at 930 to redirect water flow through the filter bank 203, chiller unit 403 (e.g., FIG. 4A), and/or carbonation system 503 (e.g., FIG. 5A). The control unit 227 can also determine from the signal from the sensor 230 whether a specific container or user has been identified and configure the smart water filter system 200 to operate in accordance with the associated set of predefined preferences as previously discussed. A filter timer can be started in 933 to control how long filtered water is provided. The time period can be based upon the identified container and/or user.

At 936, the smart water filter system 200 determines whether a change in the water flow has been detected (e.g., as indicated by the monitored flow sensors and/or provision of power by the generator). If the change in flow satisfies a predefined flow condition, then the one or more solenoids are de-energized at 939. For example, if the water flow stops because the faucet is turned off or if the water flow increases to full flow, then the smart water filter system 200 stops filtering the water by de-energizing the solenoid(s). If no change if flow is detected, then it is determined if the timer has timed out at 942. If the filter timer has expired at 942, then the one or more solenoids are de-energized at 939. If the filter timer has not expired, then the water flow is again checked at 936. After the solenoid(s) are de-energized in 939, the filter status information is updated in 945. For example, the operational (or "ON") time of the filter bank 203 can be appended and/or stored in memory for subsequent access and/or confirmation. The smart water filter system 200 can then be turned off at 927. In some cases, the smart water filter system 200 can enter a sleep mode and continue monitoring for water flow as previously discussed.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A smart water filter system, comprising:
a solenoid valve comprising an inlet coupled to a water supply connection and an outlet coupled to a faucet feed connection, the water supply connection configured to connect to a water supply line and the faucet feed connection configured to couple to a faucet via a faucet feed line;
a filter inlet connection coupled between the water supply connection and the inlet of the solenoid valve, the filter inlet connection configured to be coupled to a filter bank; and
a filter outlet connection coupled between the outlet of the solenoid valve and the faucet feed connection, the filter outlet connection configured to be coupled to the filter bank;
where activation of the solenoid valve stops flow of unfiltered water through the faucet feed line and simultaneously initiates flow of only filtered water from the filter bank through the faucet feed connection.

2. The smart water filter system of claim 1, further comprising a control unit configured to activate the solenoid valve in response to a first signal.

3. The smart water filter system of claim 2, wherein the first signal is provided by a sensor.

4. The smart water filter system of claim 3, wherein the sensor is a voice sensor, a touch sensor, a proximity sensor, a bump sensor, a magnetic sensor, IR sensor or a RFID sensor.

5. The smart water filter system of claim 3, wherein the solenoid valve is deactivated in response to a second signal provided by the sensor.

6. The smart water filter system of claim 1, wherein the solenoid valve is deactivated in response to stopping water flow through the faucet feed connection.

7. The smart water filter system of claim 6, comprising a flow sensor configured to detect water flow through the faucet feed connection.

8. The smart water filter system of claim 1, comprising the filter bank comprising an inlet coupled to the filter inlet connection and an outlet coupled to the filter outlet connection.

9. The smart water filter system of claim 8, wherein the filter bank comprises one or more filter cartridges.

10. The smart water filter system of claim 1, wherein the water supply line is a cold water supply line.

11. A smart water filter system, comprising:
an electrically operated valve comprising an inlet coupled to a water supply line and an outlet coupled to a water feed line supplying a faucet; and
a filter bank having an inlet coupled to the water supply line before the inlet of the electrically operated valve and an outlet to provide filtered water from the filter bank, the outlet of the filter bank coupled to the water feed line after the outlet of the electrically operated valve, where the electrically operated valve is configured to control flow of unfiltered and filtered water through the faucet, where flow of the unfiltered water through the faucet is stopped by the electrically operated valve and flow of only filtered water from the filter bank to flow through the faucet is simultaneously initiated by the electrically operated valve.

12. The smart water filter system of claim 11, wherein the electrically operated valve stops the flow of unfiltered water through the faucet and initiates the flow of the filtered water through the faucet when activated.

13. The smart water filter system of claim 11, wherein the electrically operated valve stops the flow of unfiltered water through the faucet and initiates the flow of the filtered water through the faucet when deactivated.

14. The smart water filter system of claim 11, further comprising a control unit configured to control activation of the electrically operated valve in response to a control signal.

15. The smart water filter system of claim 14, wherein the control signal is received from an activation sensor.

16. The smart water filter system of claim 15, wherein the activation sensor is a voice sensor, a touch sensor, a proximity sensor, a bump sensor, a magnetic sensor, IR sensor or a RFID sensor.

17. The smart water filter system of claim 15, wherein the control signal is a wireless signal transmitted by the activation sensor.

18. The smart water filter system of claim 14, wherein the control unit is further configured to control activation of the electrically operated valve in response to flow of filtered water through the water feed line.

19. The smart water filter system of claim 14, comprising a sensor configured to detect flow though the water feed line.

20. The smart water filter system of claim 11, wherein the water supply line is a cold water supply line.

21. A method for providing filtered water through a faucet, comprising:
activating an electrically operated valve in response to a filtered water request, where the electrically operated valve redirects unfiltered water away from the faucet and directs the filtered water to the faucet when activated;
monitoring for a change in water flow to the faucet; and
in response to detecting the change in the water flow, terminating flow of the filtered water to the faucet and directing the unfiltered water to the faucet by deactivating the electrically operated valve.

22. The method of claim 21, wherein the electrically operated valve is a solenoid valve.

23. The method of claim 21, wherein the unfiltered water is redirected to a filter bank to provide the filtered water.

24. The method of claim 21, wherein the change in the water flow is detected by a flow sensor.

25. The method of claim 21, wherein the filtered water request is provided in response to a user input received after initiation of unfiltered water flow through the faucet.

26. The method of claim 25, wherein the user input is provided though a voice sensor, a touch sensor, a proximity sensor, a bump sensor, a magnetic sensor, IR sensor or a RFID sensor.

* * * * *